(12) United States Patent
Selig et al.

(10) Patent No.: US 6,503,058 B1
(45) Date of Patent: Jan. 7, 2003

(54) AIR FOIL CONFIGURATION FOR WIND TURBINE

(75) Inventors: Michael S. Selig, Makomet, IL (US); Kyle K. Wetzel, Lawrence, KS (US)

(73) Assignee: Zond Energy Systems, Inc., Tehachapi, CA (US)

( * ) Notice: Subject to any disclaimer, the term of this patent is extended or adjusted under 35 U.S.C. 154(b) by 0 days.

(21) Appl. No.: 09/561,674

(22) Filed: May 1, 2000

(51) Int. Cl.$^7$ .................................................. F03B 3/12
(52) U.S. Cl. ............................ 416/223 R; 416/DIG. 2; 416/DIG. 5
(58) Field of Search ............................ 416/223 R, 243, 416/DIG. 2, DIG. 5

(56) References Cited

U.S. PATENT DOCUMENTS 5,562,420 A  * 10/1996  Tangler et al. .......... 416/223 R
6,068,446 A  *  5/2000  Tangler et al. .......... 416/223 R

OTHER PUBLICATIONS

Journal of Wind Engineering and Industrial Aerodynamics, 39 (1992) 151–160 Elsevier Science Publishers B.V., Amsterdam—Printed in the Netherlands. Tittle, "Thick Airfoils for HAWTs". Authors, W.A. Timmer and R.P.J.O.M van Rooy.*

NREL?TP—442—7109 UC Category: 1211 DE95000267. Tittle, "NREL Airfoil Families for HAWTs". Authors, J.L. Tangler and D. M. Somers. Copies call 615–576–8401 USA or 703–487–4650 USA.*

* cited by examiner

Primary Examiner—Edward K. Look
Assistant Examiner—James M McAleenan
(74) Attorney, Agent, or Firm—Blakely, Sokoloff, Taylor & Zafman LLP

(57) ABSTRACT

A balancing of aerodynamic optimization and structural optimization provides a wind turbine airfoil having substantially improved performance characteristics. Mathematic modeling yields maximum aerodynamic criteria that are coupled with a structural analysis to modify the optimum aerodynamic design into a balanced, substantially optimized airfoil configuration. The resulting airfoils have substantial performance impact on GAEP. The airfoil is based on the theoretical optimum aerodynamic structure modified as required to maximize structural integrity. The method for maximizing airfoil performance permits the design of airfoils of predictable performance while achieving necessary structural integrity. A family of airfoils having operational and structural characteristics with substantially enhanced performance capability includes thickness-to-chord ratios ranging from 14% to 45%.

13 Claims, 21 Drawing Sheets

| t/c (%) | Station 1 25%-30% | Station 2 55%-60% | Station 3 75%-80% | Station 4 90%-95% |
|---|---|---|---|---|
| 12 | | | | X |
| 14 | | | | X |
| 16 | | | X | X |
| 18 | | | X | |
| 21 | | X | X | |
| 24 | X | X | | |
| 27 | X | X | | |
| 30 | X | | | |
| 35 (30T) | X | | | |
| 40 (30T) | X | | | |
| 45 (30T) | X | | | |

FIG. 1

| Design Cl | Station 1 25%-30% | Station 2 55%-60% | Station 3 75%-80% | Station 4 90%-95% |
|---|---|---|---|---|
| 1.05 | X | X | X | X |
| 1.25 | X | X | X | X |
| 1.45 | X | X | X | X |

FIG. 2

| Case | Station 1<br>25%-30% rad.<br>t/c / Design $c_l$ | Station 2<br>55%-60% rad.<br>t/c / Design $c_l$ | Station 3<br>75%-80% rad.<br>t/c / Design $c_l$ | Station 4<br>90%-95% rad.<br>t/c / Design $c_l$ |
|---|---|---|---|---|
| Baseline | 24% / 1.45 | 21% / 1.45 | 16% / 1.25 | 14% / 1.25 |
| 1a | 24% / 1.05 | 21% / 1.05 | 16% / 1.05 | 14% / 1.05 |
| 1b | 24% / 1.25 | 21% / 1.05 | 16% / 1.05 | 14% / 1.05 |
| 2a | 27% / 1.25 | 21% / 1.25 | 16% / 1.05 | 14% / 1.05 |
| 2b | 27% / 1.45 | 24% / 1.25 | 18% / 1.25 | 16% / 1.05 |
| 3a | 30% / 1.45 | 24% / 1.25 | 16% / 1.25 | 14% / 1.05 |
| 3b | 30% / 1.45 | 24% / 1.45 | 18% / 1.25 | 16% / 1.25 |

AIR FOIL CONFIGURATION FOR WIND TURBINE

BACKGROUND OF THE INVENTION

1. Field of the Invention

The subject invention is generally related to wind power turbines and is specifically directed to a family of airfoil configurations for optimizing the performance of the wind turbine.

2. Discussion of the Prior Art

Wind power turbines are well known. The turbine blades or airfoils are one of the primary factors in determining the efficiency of the system and thus are a critical factor in optimizing performance. Typically, the turbine rotor blade design proceeds by first identifying a family of airfoils to be employed and then determining the optimum spanwise distribution of solidity and twist in order to optimize the power coefficient at each spanwise location. This procedure often does not result in the structurally optimal blade for the specific application. Various efforts to optimize the blade configuration have been used over the years, with varying results.

By way of example, Zond Energy Systems, Inc. (the Assignee of the subject invention) has generally used a thinner airfoil configuration than its European counterparts. For example, the 34 meter blades manufactured by LM Glasfibre for Tacke's 70 meter TW1.5s system employ a 39% thick section at the 25% spanwise location as compared t a 24% thick section on the comparable Zond Z46/48/50 blades. Even at 40% span, the airfoil section is 30% thick. This has a significant impact upon drag, reducing the energy capture from these blades by as much as 10%.

Turbines currently on the market have rotor loading of approximately 0.42–0.45 kW/m² for machines certified IEC Class 1, 0.38–0.41 kW/m² for Class 2 and 0.33–0.38 kW/m² for Class 3. Taking a given wind turbine and then scaling both the rotor and drive train, including the generator, in proportion to each other it is a fairly straightforward series of calculations to determine the dependence of blade loads upon rotor size. If it is assumed that the rotor aerodynamics and solidity remain constant as the rotor is scaled, then the rated wind speed will remain constant for the various sized machines. For a turbine such as Zond's 750 kW series, the tip speed of 85 m/s is approximately the higher limit. Using this as a fixed tip speed, in can be determined that the rated shaft speed will scale inversely to the rotor:

$$\Omega_{rated} = V_{tip}/R \quad \text{(Equation 1)},$$

where $\Omega_{rated}$ is the rated shaft speed, $V_{tip}$ is the fixed tip speed and R is the rotor radius.

Since the rated power, $P_{rated}$, scales as the rotor diameter squared for a fixed rotor loading, and since the rated power is a product of the rated torque and the rated shaft speed, it follows that the rated torque scales as the cube of the rotor diameter:

$$\Omega_{rated} = P_{rated}/\Omega_{rated} = \tfrac{1}{2}(\rho V^3_{rated} C_p \pi R^2)(R/V_{tip}) \sim R^3 \quad \text{(Equation 2)}$$

The rated torque results from the in-plane aerodynamic forces acting over the length of the blade. Mathematically, it results from the summation of the product of theses forces and the moment arm over the length of the blade:

$$Q_{rated} = \int_{r_{hub}}^{R} F_x(r) r\, dr = R^2 \int_{r_{hub}/R}^{1} F_x(r/R)(r/R)\, d(r/R) \quad \text{(Equation 3)}$$

Where $F_x$ represents the in-plane forces per unit length.

The mathematical model for all wind turbine airfoils follows these equations. What remains is to develop a better understanding of these models in order to maximize airfoil design. At present certain aspects of the design are not clearly understood and the resulting airfoil designs of the prior art are less than optimum.

SUMMARY OF THE INVENTION

The combination of aerodynamic optimization and structural optimization in accordance with the teachings of the invention results in a new and novel airfoil design having substantially improved performance characteristics of airfoil designs of the prior art. The aforementioned mathematic modeling yields maximum aerodynamic criteria. This is then coupled with a structural analysis to modify the optimum aerodynamic design into a balance, substantially optimized airfoil configuration. The resulting airfoils of the subject invention have substantial performance impact on GAEP when compared to the airfoils of the prior art. The subject invention is an airfoil design based on the theoretical optimum aerodynamic structure modified as required to maximize structural integrity.

The subject invention is the result of an effort to maximize and optimize airfoil configuration and design by determining the important characteristics of the mathematical definition of the airfoil consistent with the above prior-art recognized mathematical modeling.

This procedure provides the criteria for maximizing airfoil performance to achieve highest GAEP while taking into consideration the aerodynamic design parameters as balanced against structural requirements. The methodology of the subject invention permits the design of airfoils of predictable performance while achieving necessary structural integrity.

As a result of this approach, the subject invention has resulted in a family of airfoils having operational and structural characteristics with substantially enhanced performance capability over prior airfoils used in the same or similar applications. The family of airfoils includes thickness-to-chord ratios ranging from 14% to 45%.

In accordance with the invention, if the rotors are scaled up proportionately (i.e., the solidity remains constant), then substitution of Equation 2 into Equation 3 results in the conclusion that F, at any equivalent spanwise location (i.e., r/R) scales as the rotor diameter:

$$F_x \approx R \quad \text{(Equation 4)}$$

For high lift-to-drag ratios, the in-plane forces in the outboard regions that dominate the structural loads result largely from the product of the dynamic pressure, the chord length, the lift coefficient, and the in-flow angle:

$$F_x = q_{rated} c C_1 \sin \Phi \quad \text{(Equation 5)}$$

where $\Phi$ is the inflow angle.

Since the rotor is being scaled up, the chord, c, also scales as the rotor diameter. Since the rotor loading remains constant, $q_{rated}$ and $\sin\phi$ remain constant, it follows from Equations 4 and 5 that C1 remains constant along the blade as they are scaled up. Since none of the flow angles or blade geometry changes other than being scaled up, it follows that the out-of-plane forces per unit length also scale as the rotor diameter:

$$F_x = q_{rated} c C_1 \cos \Phi \approx R \quad \text{(Equation 6)}$$

Therefore, the flapwise blade root bending moment $My_{rated}$ also scales as the rotor diameter cubed:

$$M_{yrated} = \int_{r_{hub}}^{R} F_y(r) r \, dr = R^2 \int_{r_{hub}/R}^{1} F_y(r/R)(r/R) \, d(r/R) \approx R^3 \quad \text{(Equation 7)}$$

In the subject invention, it has been determined that when the rotor is scaled up in diameter (keeping the solidity constant), while the rated power and tip speed both remain constant, the rated wind speed drops as the rotor diameter increases, according to the well-known relationship:

$$P_{rated} = (\tfrac{1}{2}) \rho V^3_{rated} C_p \pi R^2 \quad \text{(Equation 8)}$$

Assuming the rated power is constant, this yields:

$$V_{rated} \approx R^{-\frac{1}{3}} \quad \text{(Equation 9)}$$

This leads to the conclusion that the rated tip speed ration, X, increases with the rotor diameter:

$$X = (V_{tip}/V_{rated}) \approx R^{\frac{1}{3}} \quad \text{(Equation 10)}$$

For a constant tip speed.
In this instance, Equation 2 becomes:

$$Q_{rated} = P_{rated}/\Omega_{rated} = P_{rated}(R/V_{tip}) \approx R \quad \text{(Equation 11)}$$

Substituting Equation 3 into Equation 11, this yields:

$$F_x \approx 1R \quad \text{(Equation 12)}$$

Which is dramatically different than previously assumed. Looking again at Equation 5, in the methodology of the subject invention the dynamic pressure at outboard station is dominated by the tangential velocity, so the drop in rated wind speed has little effect on the dynamic pressure at rated wind speed. Thus, the inflow angle varies inversely with the local speed ration and Equations 5 and 12 become:

$$F_x = q_{rated} c C_1 \sin \Phi \approx RC_1(1/X) \approx RC_1(1/X) \approx C_1 R^{1/3} \quad \text{(Equation 13)}$$

Substituting Equation 10 for X, combining Equations 12 and 13 yields:

$$C1 \approx R^{-4/3} \quad \text{(Equation 14)}$$

at rated wind speeds. Substituting Equation 14 into Equation 6 yields $$F_y \approx q_{rated} c C_1 \cos \Phi \approx R^{-1/3} \quad \text{(Equation 15)}$$

Fx and Fy represent the values at a given equivalent spanwise location, i.e., the same r/R location on each blade. Now, substituting Equation 15 into Equation 7, the result is:

$$M_{y\,rated} = \int_{r_{hub}}^{R} F_y(r) r \, dr = R^2 \int_{r_{hub}/R}^{1} F_y(r/R)(r/R) \, d(r/R) \approx R^{5/3} \quad \text{(Equation 16)}$$

In the stated case, the root bending moment scales as the radius to the power 1.66.

This model was confirmed using Bladed and three rotors for a 750 kW turbine. (Bladed is a commercially available design program offered by Garrad Hassan). With a 50 m rotor, a 52 m rotor and a 55 m rotor. The measured scaling factor was in the range of 1.6, or very close to the calculated theoretical scale factor of 1.66 as derived in Equation 15). Realizing that the calculated analysis (Equation 16) ignores a number of secondary effects, e.g., the influence of the changing rated wind speed on the dynamic pressure and other variables, the actual test substantially verifies the calculated analysis. Recognizing that fatigue loads derive from the same aerodynamic model used in the above analysis, which calculates static (extreme) loads, it can be presumed that the fatigue loads will scale similarly as in Equation 16.

Using the assumption derived from the trade-off studies that halving the blade stiffness (doubling the deflection) results in a 15% reduction in fatigue, then Equation 16 can be used to calculate what size rotor will result in a 15% increase in loads. For example, using a Tackes's TW1.5s turbine with a 70.5 m rotor and a 1,500 kW rating it can be determined from the trade-off studies that when the stiffness of the blade is halved that the loads will be reduced 15%.

The rotor can then be scaled up in accordance with the following formula, which is derived from Equation 16:

$$(M_{rated})_{larger, flexible} = (M_{rated})_{baseline, flexible}(R_{larger}/R_{baseline})^{5/3} \quad \text{(Equation 17)}$$

$$= .85(M_{rated})_{baseline}(R_{larger}/R_{baseline})^{5/3}$$

$$= (M_{rated})_{baseline}$$

and, solving for the new rotor diameter yields:

$$R_{larger}/R_{baseline} = (1.85)/6 = 1.10 \quad \text{(Equation 18)}$$

Thus, the 70.5 m rotor could be increased by 10%, to a 77 m rotor without increasing the key design fatigue loads if the stiffness is relaxed two-fold. This results in a 20% increase in swept area and, assuming 50% of the energy capture comes from operation below rated, a 10% increase in net annual energy production. This example is for a rotor loading of 0.32 kW/m$^2$ (for IEC Class 2).

As a result of this analysis, a number of initial rotor optimization studies were undertaken using a 77 m root diameter. This resulted in a final sizing analysis wherein a 1.8 MW machine, which is more cost effective, results in a scaling of the rotor diameter to 85 m. In the preferred embodiment, a more conservative 80.5 m rotor diameter is used.

As a result of these studies it has been determined that:
1. Airfoils up to 30% thick can be used at the first station (25%–30% radius) without significant loss in GAEP (Gross Annual Energy Production).
2. To maximize GAEP, the airfoil t/c (thickness) should not exceed 21%, 18% and 14%, for the second (55%–60% radius), third (75%–80% radius) and fourth blade stations (90%–95%), respectively.

3. Increasing the design cl increased the GAEP. Over the range of design $c_1$ a value of 1.25 was found to be the optimum for all blade stations. A lower design $c_1$ in the tip region is beneficial for keeping the blades out of stall.

4. The loss in GAEP from increasing the airfoil t/c along the blade can be easily compensated by increasing the design $c_1$. Thicker airfoils can be used without sacrificing energy capture.

These aerodynamic studies have been combined with structural design studies to provide a comprehensive design criteria wherein the thickness and lift range of the airfoils is optimized. For optimum aerodynamic performance, thin airfoils having high lift-to-drag ratios are desired while thick airfoils are favorable for structural reasons. High-lift airfoils yield larger lift-to-drag ratios for a given amount of laminar flow as compared with low-lift airfoils, which increases energy capture. High-lift airfoils also have, however, structural implications. Consequently, a balance between aerodynamic and structural considerations is required for defining the optimum airfoil t/c and lift range for a particular blade.

Thus, it is desirable to quantify the effects of airfoil thickness (t/c) and lift range on energy capture. A tradeoff study using the 1.63-MW NGT having a 77 m rotor was used to quantify this information. The analysis yielded data quantifying the effect of airfoil t/c and lift range on the GAEP for a single blade segment at four different radial positions. Entire blades were then designed for maximum energy capture, using the most promising airfoil t/c and lift range for each of the four selected stations. The effects of truncating the inboard chords of the blades on energy production provided data establishing the impact of minimizing the blade area in the root region. For a given set of airfoils it was found that a reduction in chord yields a decrease in physical thickness that is not desired structurally unless the airfoils are also truncated.

In the preferred embodiment the blade geometry is designed for maximum annual energy production. In designing each blade segment, the optimum axial inflow of 113 and design lift coefficient $c_1$ are prescribed and the corresponding chord and twist/pitch are obtained using the inverse design capability of the computer program PROPID (PROPID is a commercially available design program. A selected design $c_1$, which is the $c_1$ for which maximum lift-to-drag ratio is achieved, results in the same chord length independently of the airfoil t/c considered. In the example used to confirm this analysis the following design constraints were used:

Mechanical rated power of 1.8 MW.

System efficiency of 90%, yielding an electrical rated power of 1.62MW

Three-bladed, upwind rotor having a diameter of 77 m

Design tip-speed ratio of 7.68, which corresponds to a tip-speed of 80 m/s at rated power Sea level atmospheric conditions.

In order to determine the annual energy production on this model, an IEC wind class II (average wind speed of 8.5 m/s at hub height) and a Rayleigh wind speed distribution were considered. No losses were taken into account apart from the 90% system efficiency. The GAEP was computed at 100% availability.

The design process was carried out on blade segments at four radial stations, namely 25%–30% radius, 55%–60% radius, 75%–80% radius, and 90%–95% radius. The design $c_1$ is prescribed to 1.05 and the airfoil thickness is varied for each of the four radial stations. Also, the airfoil thickness at each radial station was fixed and the design $c_1$ was varied. For this study on the effects of the design $c_1$ on energy capture, the airfoil t/c was fixed at 27% for station 1, 21% for station 2 16% for station 3 and 12% for station 4. Entire blade design is also considered with the airfoils used along the blade defined at the same four stations as the segment designs and the hub modeled as a cylinder.

Out of this study, a baseline case has been developed representing a best-case scenario in terms of maximizing energy capture as it uses higher-lift airfoils than those of the prior art Z-48 blade, while having similar airfoil t/c distribution.

Out of this it has been determined that airfoils up to 30% thick can be used at the first station (25%–30% radius) without a significant loss in GAEP. Truncating the 30% thick airfoil significantly reduces GAEP with losses up to 12 times greater than that for the non-truncated 30% airfoil. These losses in GAEP from truncating the 30% thick airfoil may be weighted against the structural advantages that truncation provides.

GAEP is maximized when the airfoil t/c does not exceed 21% 18% and 14%, for the second 55%–60% radius), third (75%–80% radius), and fourth blade stations (90%–95%), respectively.

Increasing the design $c_1$ increases the GAEP. A value of 1.25 has be found to be the optimum or all blade stations although a lower design $c_1$ in the tip region might be required depending on the ability of the controller to keep the blades out of stall.

The loss in GAEP from increasing the airfoil t/c along the blade can be easily compensated by increasing the design $c_1$. Therefore, thicker airfoils than those of the prior art Z-48 blade can be used without sacrificing energy capture.

Truncating or shortening the inboard chord should be limited to 25%–30% of the maximum nominal chord length value. Such truncation of the chord has only a small effect on the GAEP, particularly if the root airfoil is not truncated.

Based on this criteria, airfoil design may be optimized using a balance of maximized aerodynamic and maximized structural requirements to provide a dependable, efficient airfoil with enhanced GAEP over prior art configurations.

It is, therefore, an object and feature of the subject to provide a means and method for designing an enhanced airfoil configuration for a wind turbine maximizing aerodynamic design parameters.

It is another object and feature of the subject invention to provide a means and method for designing an enhanced airfoil configuration for a wind turbine maximizing structural design parameters.

It is a further object and feature of the subject invention to provide a means and method for designing an enhanced airfoil configuration with balanced aerodynamic and structural characteristics.

It is an additional object and feature of the subject invention to provide an airfoil designed with enhanced GAEP capability.

Other objects and features of the invention will be readily apparent from the accompanying drawings and detailed description of the preferred embodiment.

BRIEF DESCRIPTION OF THE DRAWINGS

FIG. 1 is a table showing airfoil thickness for each radial station considered in the segment designs.

FIG. 2 is a table showing lift coefficient for each radial station of FIG. 1.

FIG. 3 is a table showing airfoil thickness and design lift coefficient at each station for the full blade designs.

DETAILED DESCRIPTION OF THE PREFERRED EMBODIMENT

Figure 4:
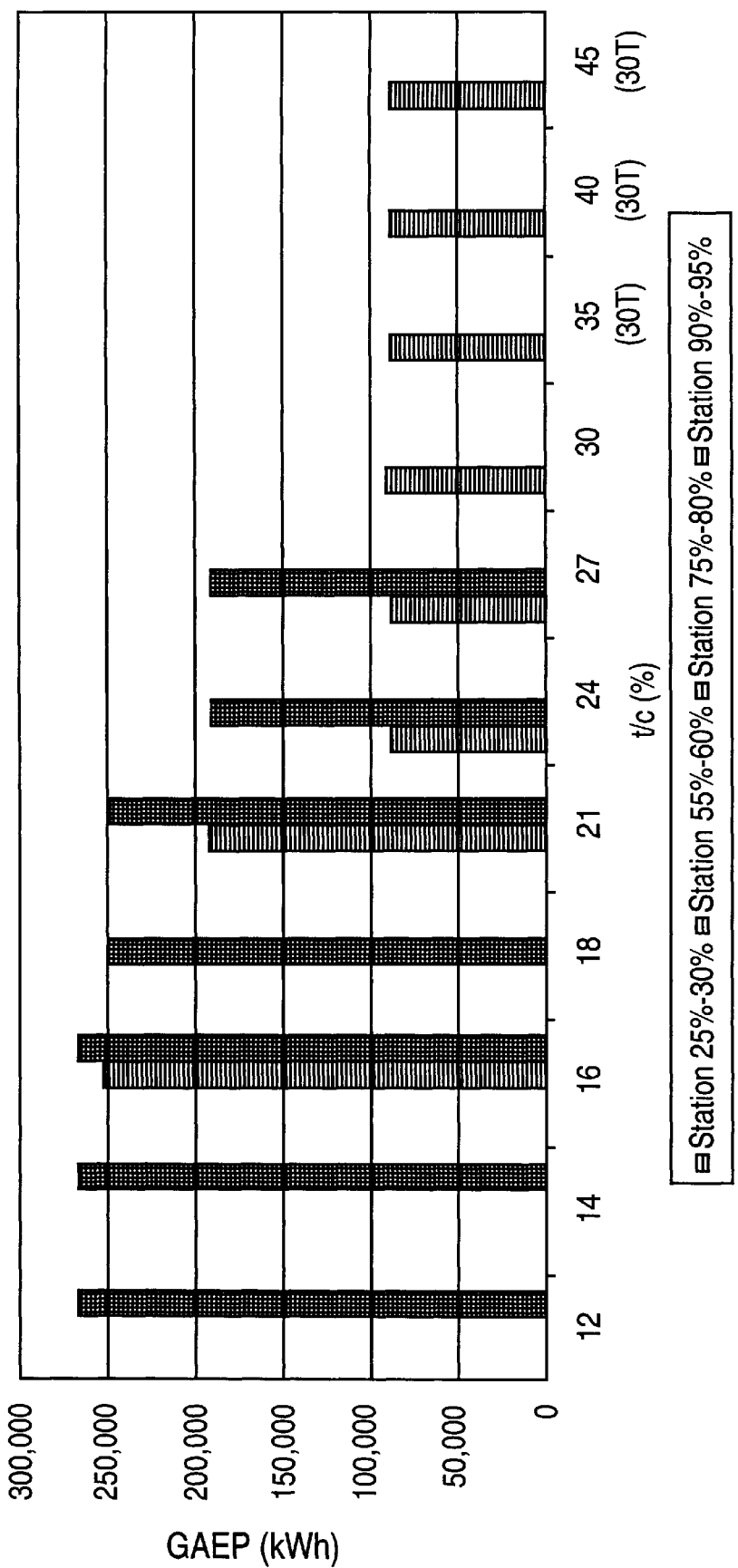
FIG. 4 is a chart showing gross annual energy production (GAEP) for different airfoil thickness and blade stations.

As described above, the maximum aerodynamic criteria for an optimum airfoil is derived using the formula:

$$M_{y\,rated} = \int_{r_{hub}}^{R} F_y(r)r\,dr = R^2 \int_{r_{hub}/R}^{1} F_y(r/R)(r/R)\,d(r/R) \approx R^{5/3} \quad \text{(Equation 16)}$$

where Equation 16 can be used to calculate what size rotor will result in a 15% decrease in loads. For example, using a Tackes's TW1.5s turbine with a 70.5 m rotor and a 1,500 kW rating it can be determined from the trade-off studies that when the stiffness of the blade is halved that the loads will be reduced 15%. The rotor can then be scaled up in accordance with the following formula, which is derived from Equation 16:

$$(M_{rated})_{larger, flexible} = (M_{rated})_{baseline, flexible}(R_{larger}/R_{baseline})^{5/3} \quad \text{(Equation 17)}$$
$$= .85(M_{rated})_{baseline}(R_{larger}/R_{baseline})^{5/3}$$
$$= (M_{rated})_{baseline}$$

and, solving for the new rotor diameter yields:

$$R_{larger}/R_{baseline} = (1/.85)/6 = 1.10 \quad \text{(Equation 18)}$$

Once this is done, then the design is modified by determining the structural characteristics and modifying from the optimized aerodynamic design in accordance the tabular information collected as shown, by way of example, in FIGS. 1–13. It should be noted that the examples used for the tabulations shown in FIGS. 1–13 are exemplary. The same methodology can be used for other structural configurations. The crux of the invention is the use of this structural data to modify the optimized aerodynamic design in order to balance the structural integrity of the airfoil with the optimum aerodynamics.

FIG. 1 shows the t/c thickness v\considered for each radial station 1–4. The fifteen cases shown in FIG. 1. The airfoil thickness at each radial station is fixed and the design C, is varied in FIG. 2. In the example for determining the effects of the design $c_l$ on energy capture, the airfoil t/c was fixed at 27% for station 1, 21% for station 2, 16% for station 3 and 12% for station 4.

The same methodology is used in connection with the design of entire blades (blade designs), and these results are shown in FIG. 3. A total of seven blade design cases are shown. The airfoils used along the blade are defined at the same four station as the segment designs and the hub is modeled as a cylinder. A cutout speed of 25 m/s is used for computing the GAEP. FIG. 3 shows the airfoil t/c and design $c_l$ at each station for the seven blade design cases. The baseline case represents a best-case scenario in terms of maximizing energy capture. The airfoil t/c and design $c_l$ distribution of a prior art Z-48 blade are that of case 1b. Case 1a shows the departures from the Z-48 blade with increasing airfoil t/c with increasing design c to counterbalance the reduction in blade chord from the use of high-lift airfoils.

The effects of truncating or shortening the inboard chord on energy capture are quantified for cases 1b, 2b and 3b. In truncating the chord, two scenarios are considered. First, the same airfoil t/c is used and thus the physical blade thickness is reduced proportionally to the decrease in chord. Second, the airfoil is truncated the same amount as the chord, thereby keeping the physical blade thickness constant.

The segment designs are subdivided into two sets of cases. The first set covers a range of airfoil t/c for a given design $c_1$ of 1.05, and the second set considered increases in the design $c_1$ while fixing the airfoil t/c. The chord length is the same for a given design $c_1$ and station while the rotor thrust are the same for a given station independently of the design $c_1$ and airfoil t/c.

FIG. 4 illustrates a comparison between GAEP of all cases shown in FIG. 1. The first station yields about ⅓ the GAEP of the fourth station. In contrast, the second and third stations provide approximately 70% and 93% of the GAEP of the fourth station, respectively. The differences in GAEP for a given station are shown in FIGS. 5–8.

Figure 5:
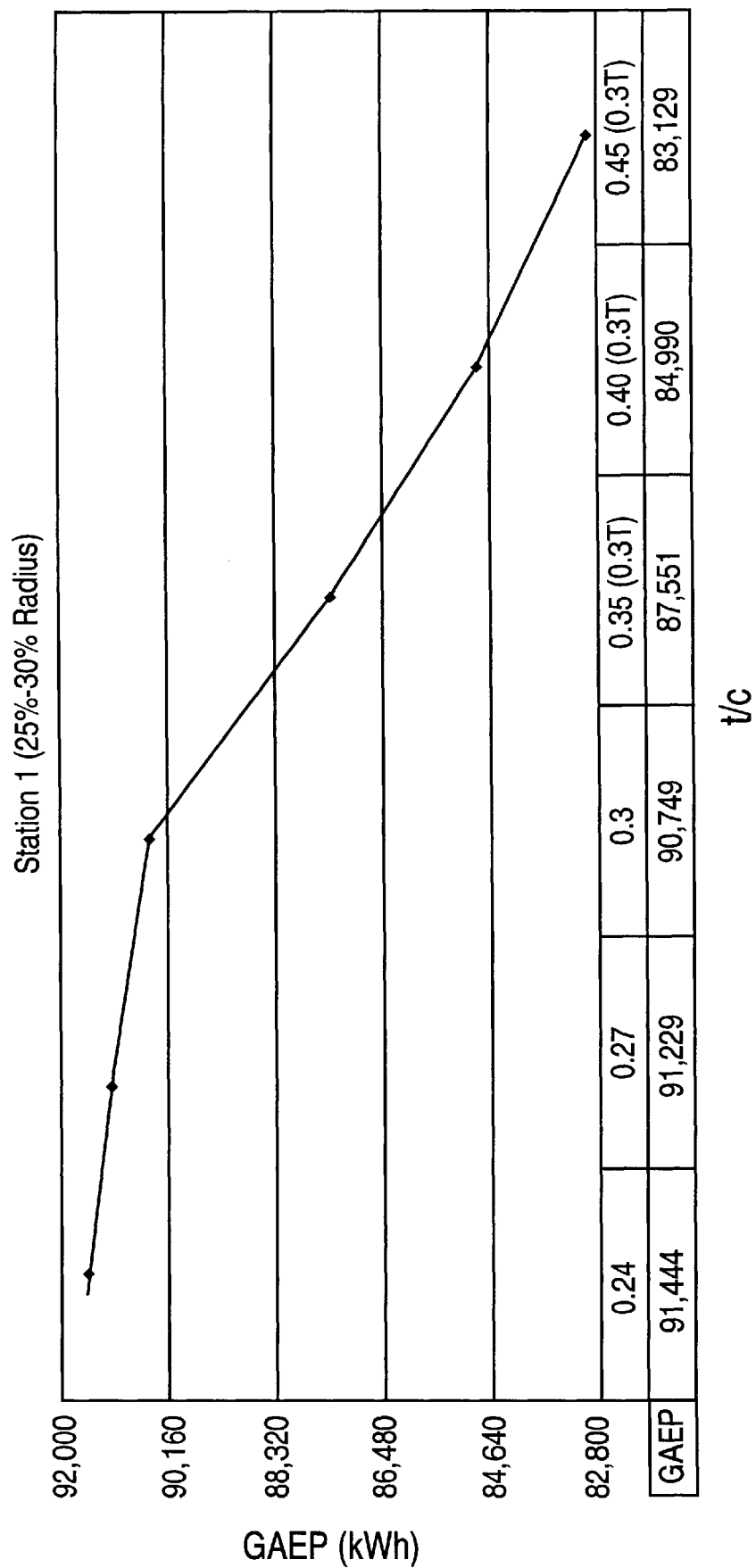
FIG. 5 is a graph showing GAEP for different airfoil thickness considered for the first station at 25%–30% radius.

The GAEP results as a function of airfoil t/c for the first station are shown in FIG. 5. The axis for the GAEP represents a 10% difference. The decrease in GAEP with airfoil t/c is relatively small for the non-truncated airfoils, and thus the structural advantages of increasing the airfoil t/c are likely to be beneficial despite the loss in GAEP. Truncating the 30% thick airfoil results in a rapid loss in GAEP. Using $0.05/kWh, the maximum difference in GAEP depicted in FIG. 4 corresponds to a loss in annual income of $416.00, which may be significant considering that this is for a single blade segment. Thus, the loss in GAEP from truncating the 30% thick airfoil should be balanced with the structural advantages that truncation provides.

Figure 6:
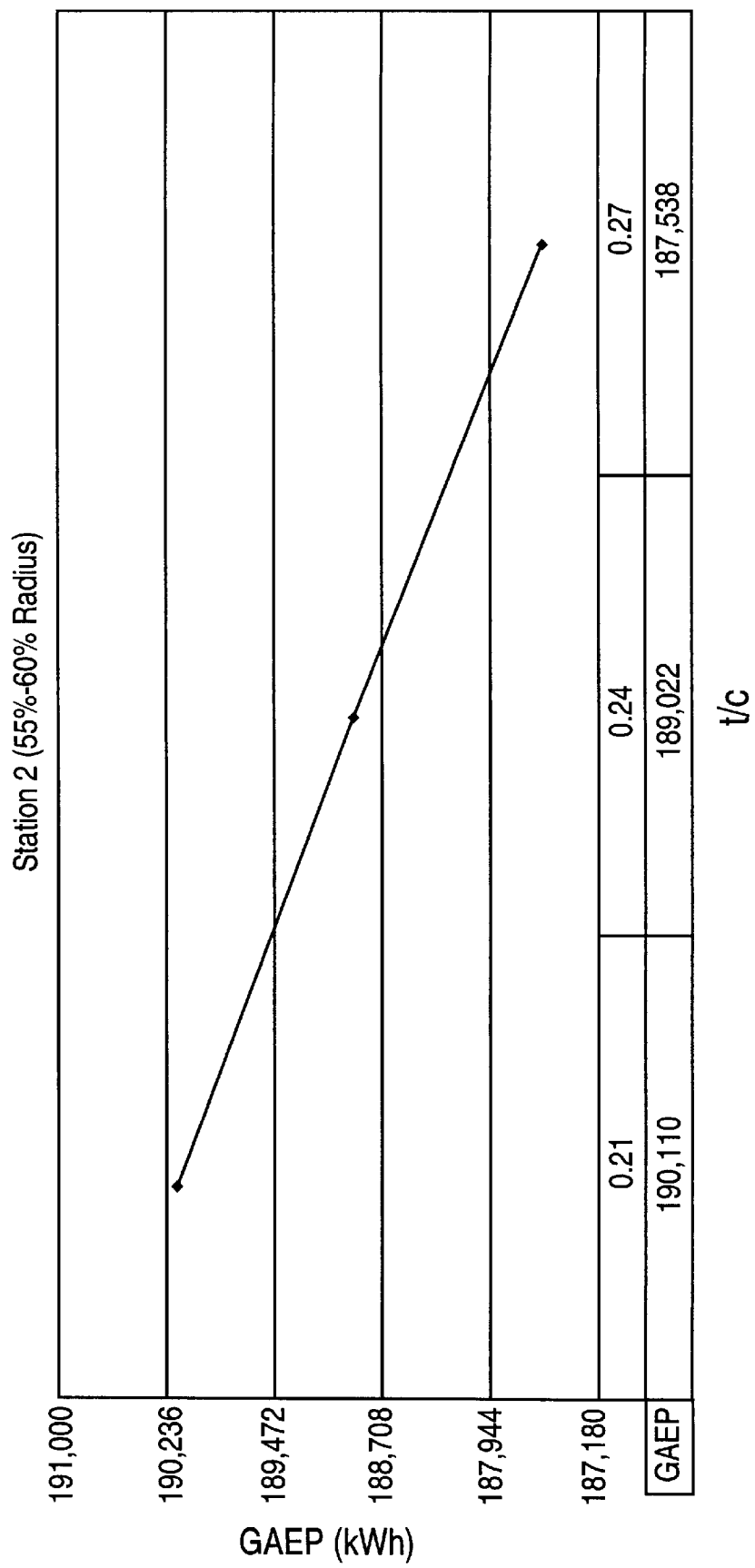
FIG. 6 is a graph showing GAEP for different airfoil thickness considered for the second station at 55%–60% radius.

FIG. 6 presents the GAEP results for the second station and shows that an airfoil t/c of 24% corresponds to the optimum point (the point of diminishing return). The axis for the GAEP represents a difference of 2%. At $0.05/K\kWh, the maximum difference in annual income is $129.00. Airfoil t/c of 21%–24% are optimum for this station.

Figure 7:
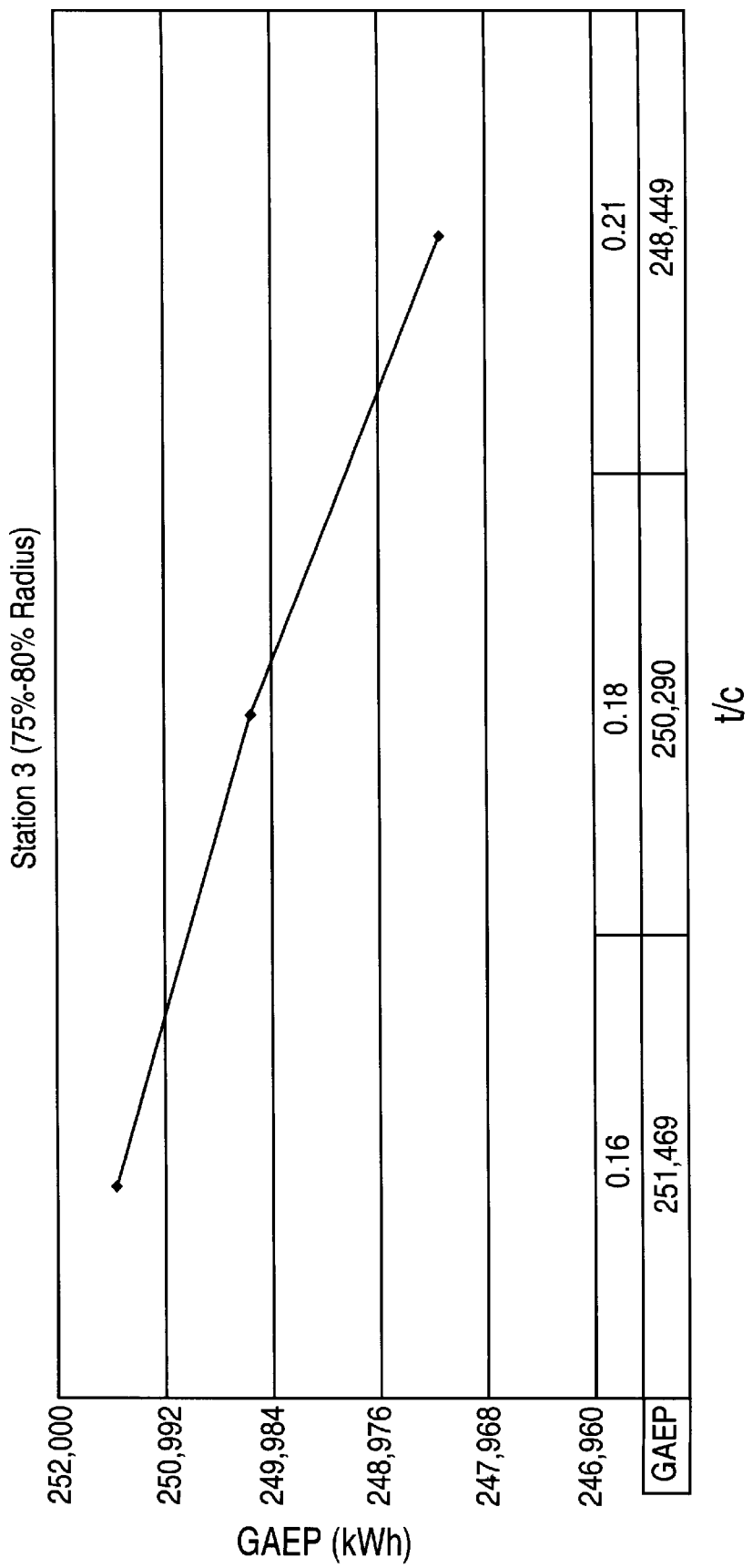
FIG. 7 is a graph showing GAEP for different airfoil thickness considered for the third station at 75%–80% radius.

The GAEP results for the third station are depicted in FIG. 7, for which the axis for the GAEP is again a 2% difference. Airfoil t/c of 18% is maximum.

Figure 8:
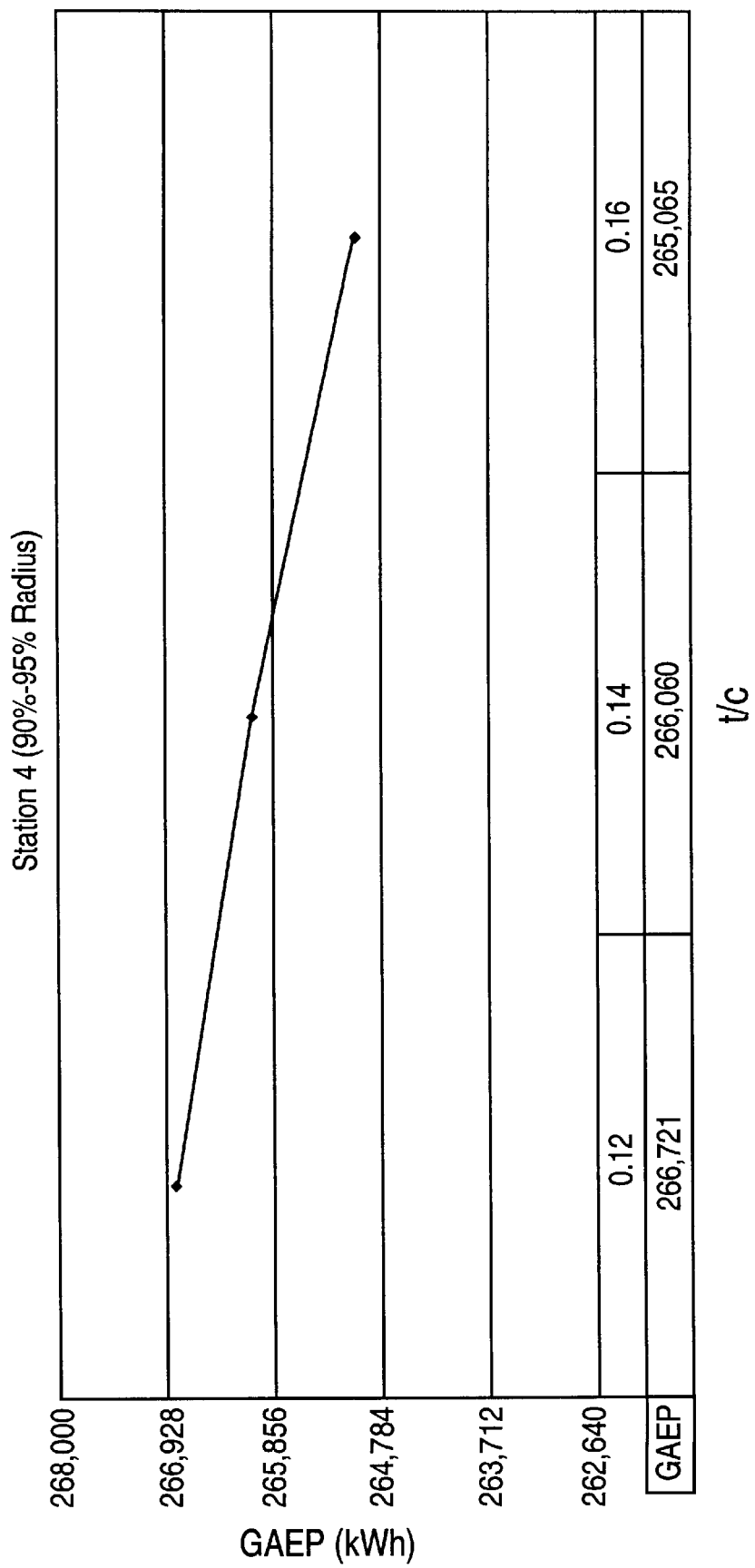
FIG. 8 is a graph showing GAEP for different airfoil thickness considered for the fourth station at 90%–95% radius.

FIG. 8 shows the GAEP results for the fourth station, with again a GAEP axis scaled for a 2% difference. The maximum airfoil t/c is 14%.

Figure 9:
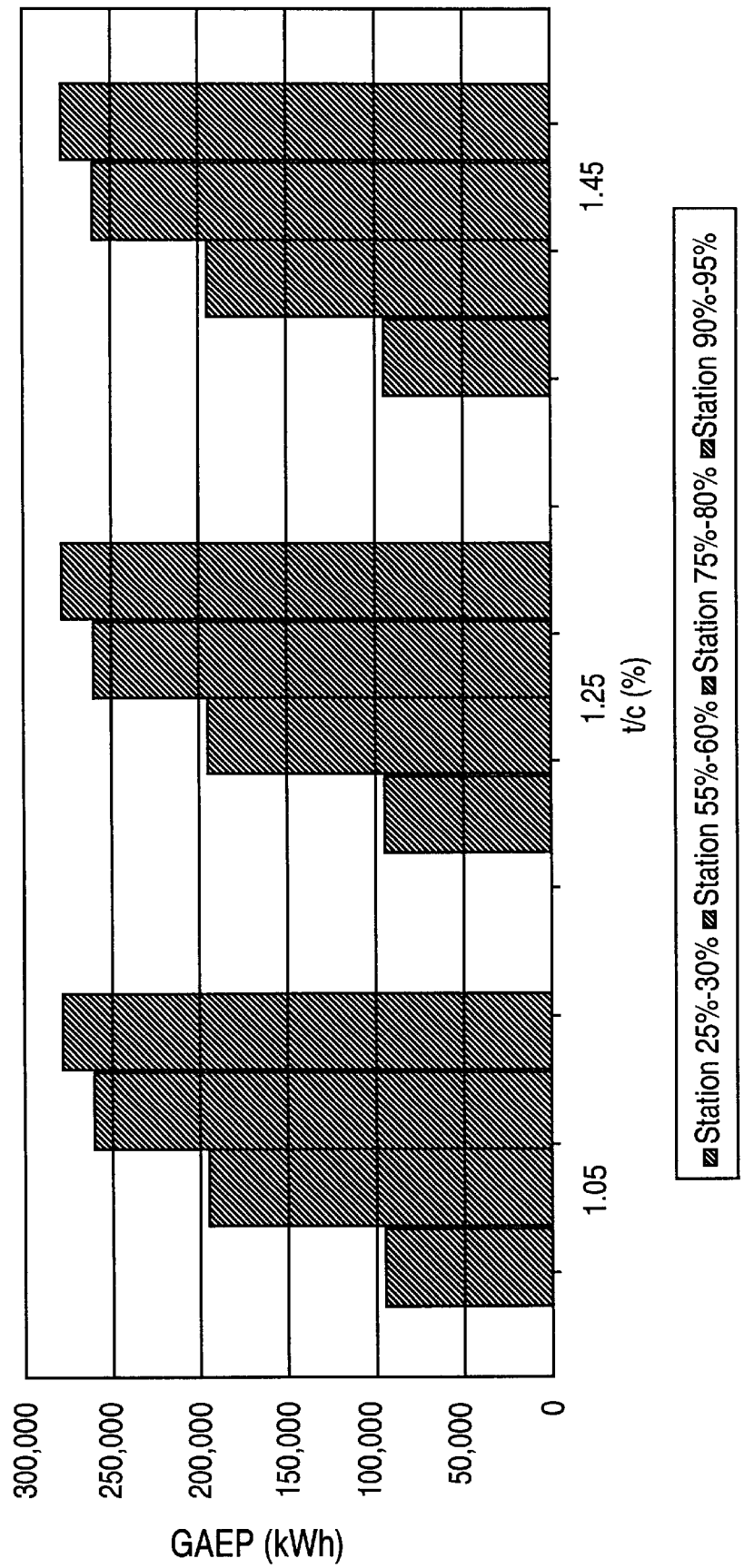
FIG. 9 is a chart showing GAEP for different airfoil design lift coefficient and blade stations.
Figure 10:
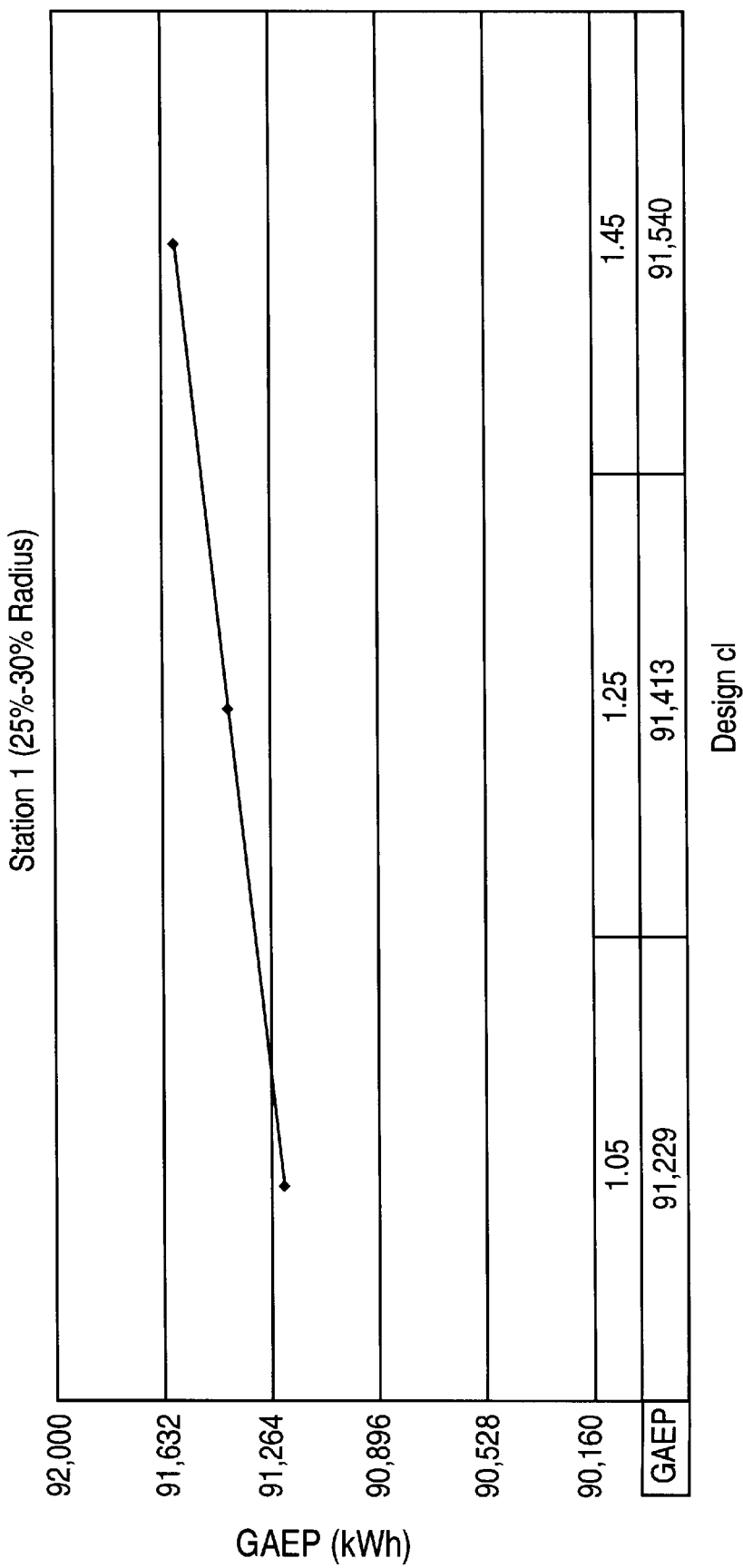
FIG. 10 is a graph showing GAEP for different design lift coefficients for the first station at 25%–30% radius.
Figure 11:
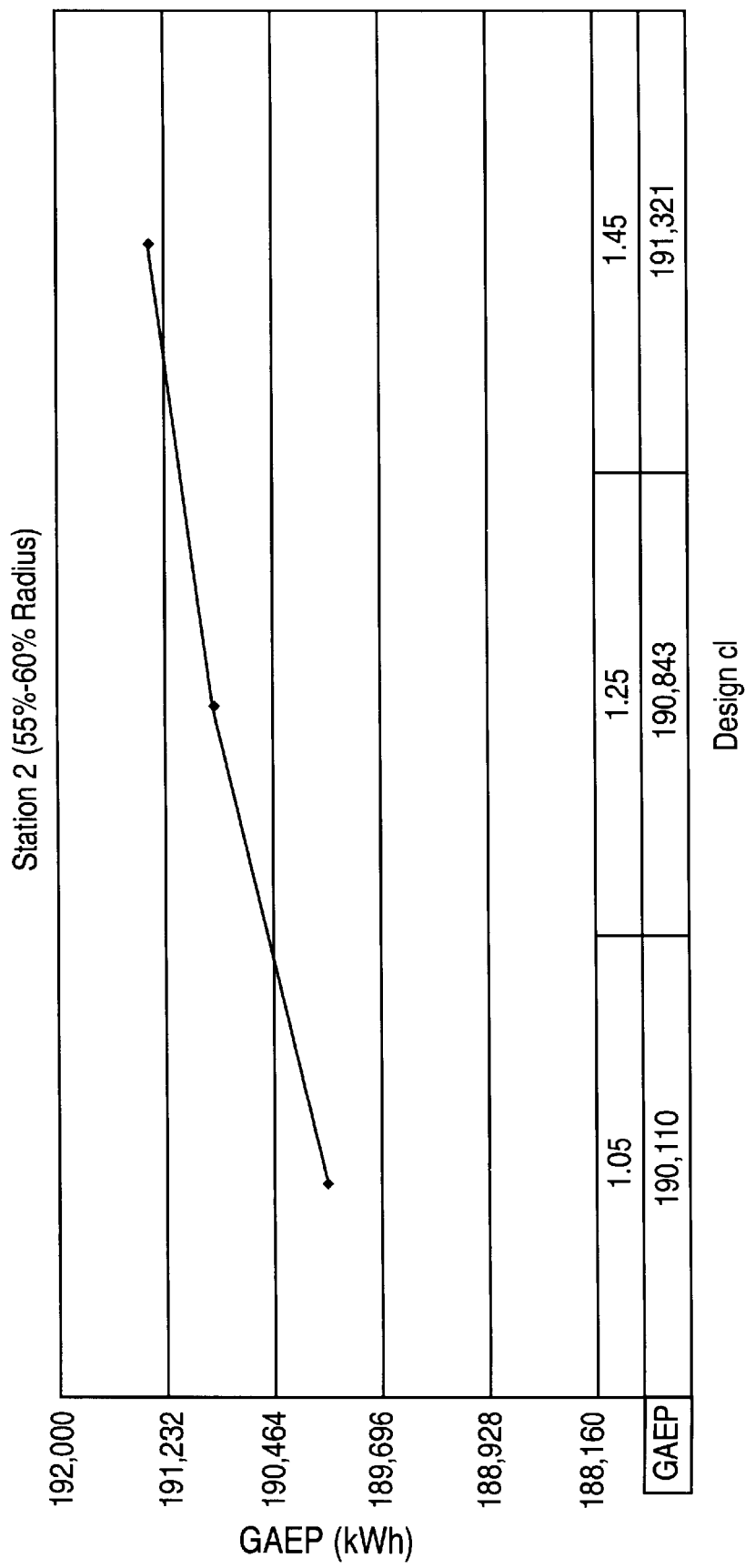
FIG. 11 is a graph showing GAEP for different design lift coefficients for the first station at 55%–60% radius.
Figure 12:
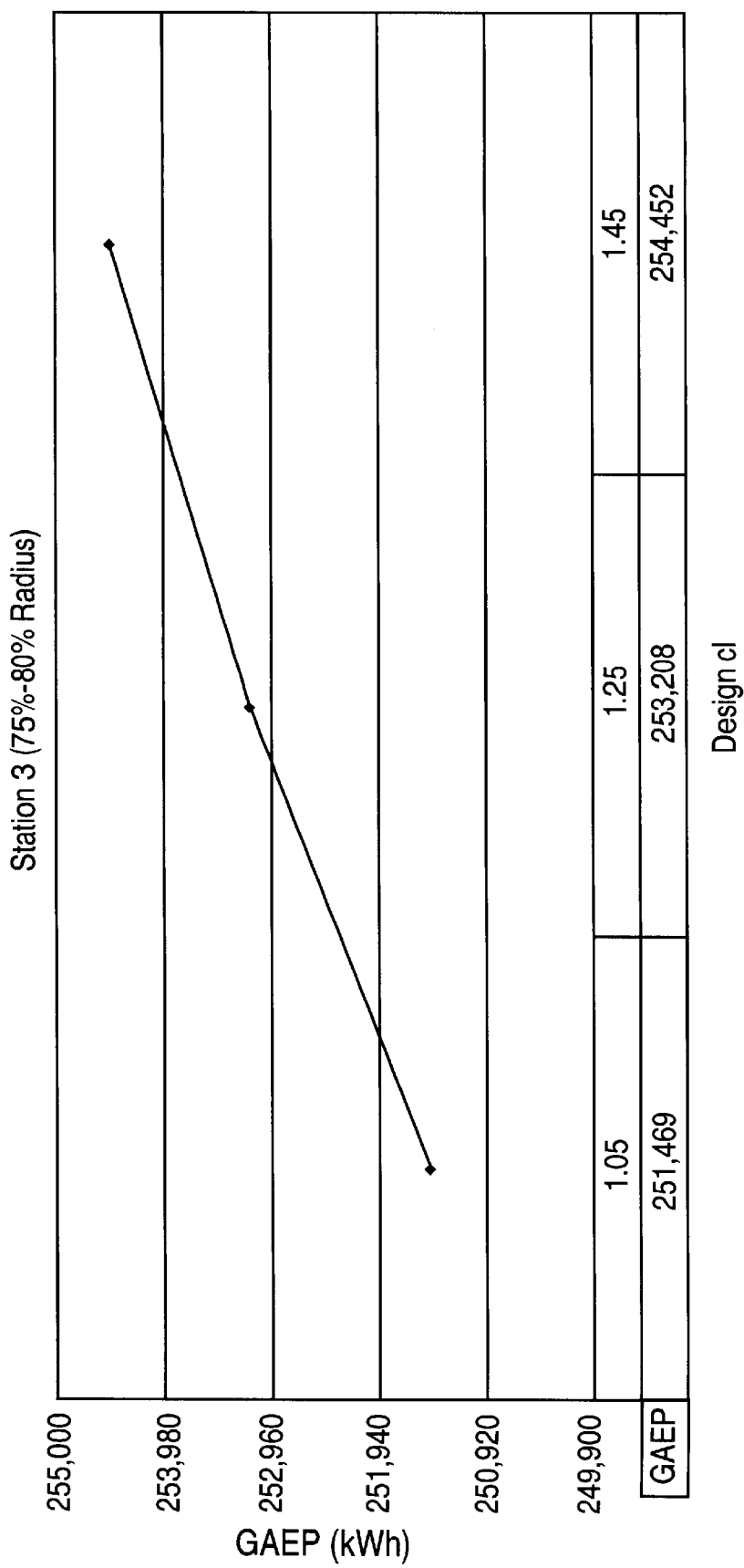
FIG. 12 is a graph showing GAEP for different design lift coefficients for the first station at 75%–80% radius.

FIG. 9 represents the GAEP of the twelve cases shown in FIG. 2. The relative differences between the results are similar to those for the variation in airfoil t/c. FIGS. 10–13 show the GAEP for each station with a GAEP axis corresponding to a maximum difference of 2%. Fore each station, increasing $c_1$ improved the GAEP and a design $c_1$ of 1.25 was found to be the point of diminishing return. The trend of increasing GAEP with increasing $c_1$ can be traced to the fixed amount of laminar flow of the airfoils.

Figures 13, 14:
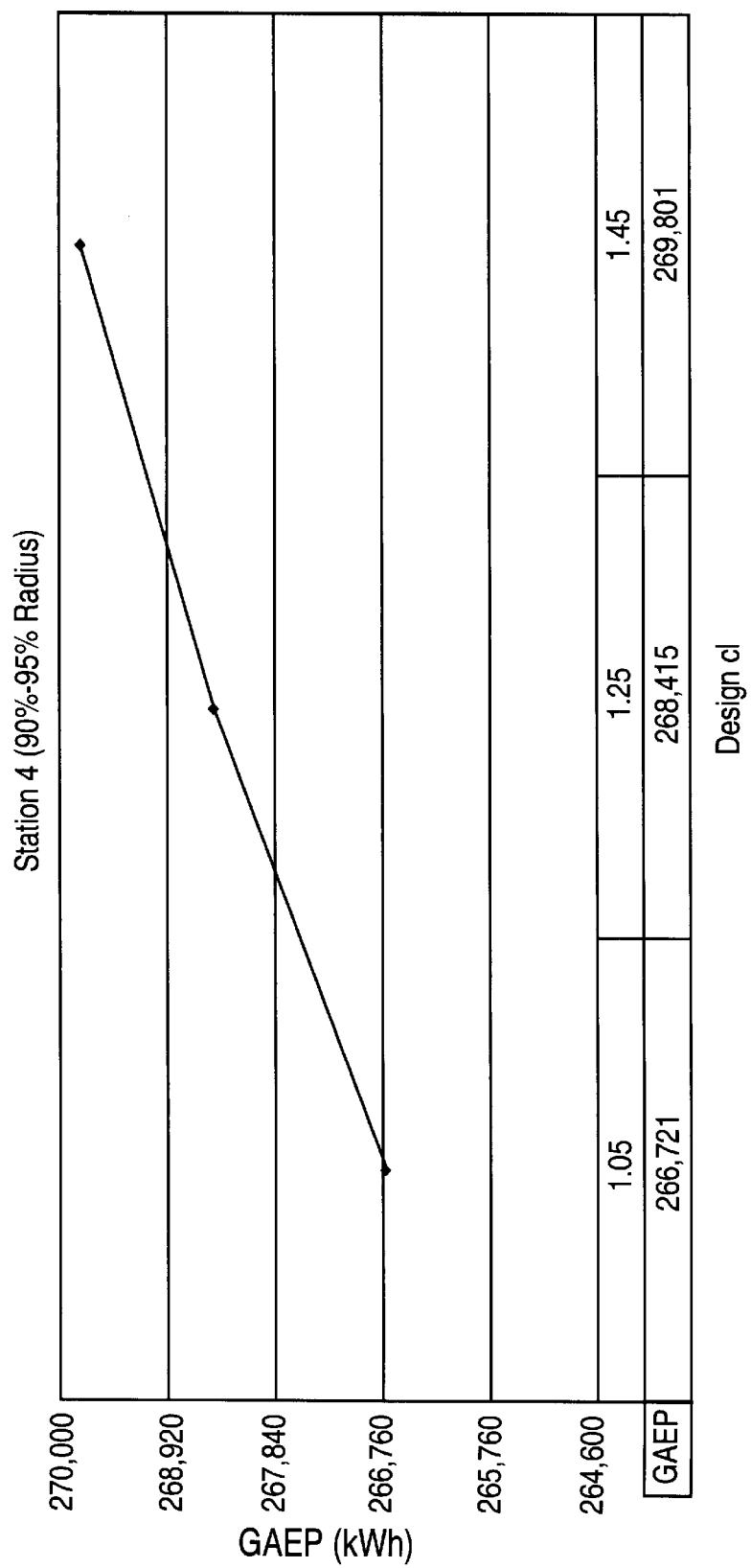
FIG. 13 is a graph showing GAEP for different design lift coefficients for the first station at 90%–95% radius.
FIG. 14 is a table showing the maximum loss in yearly income resulting from a difference of 0.4 in the design lift coefficient for one blade segment at the different stations considered.

FIG. 14 shows the difference in annual income for each station assuming a price of $0.05/kWh. The difference is small for the inboard station and thus the merit of increasing the design $c_1$ inboard is controlled by the effect of decreasing the chord on the structure. For the outboard stations, the payoff in increasing the design $c_1$ is larger.

Figure 15:
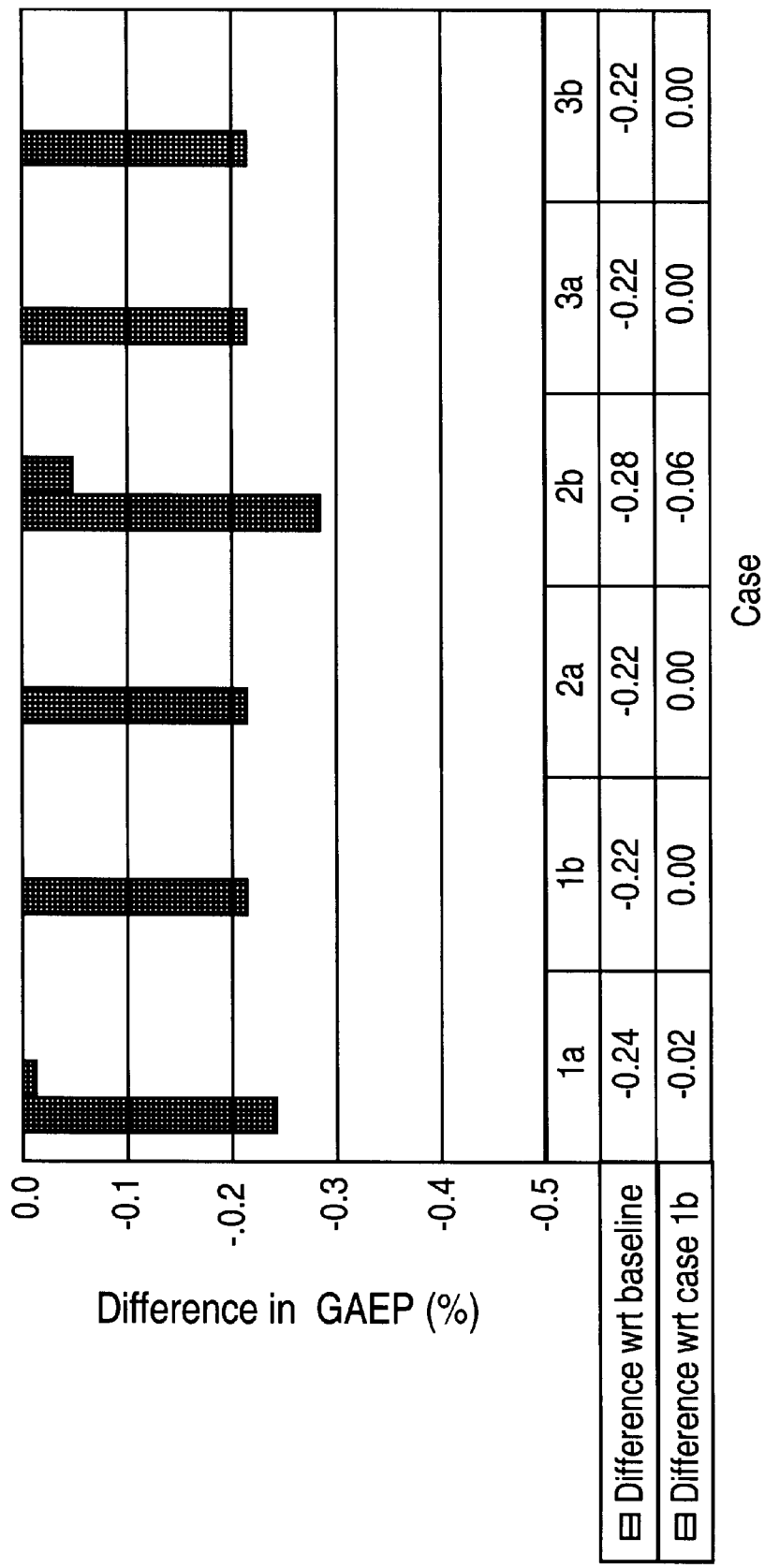
FIG. 15 is a table showing the difference in GAEP capture with respect to a baseline case (7,336.7MWh) and case 1b (7,320.6MWh) for the cases without inboard chord truncation.

The blade designs are summarized in FIGS. 15–23. FIG. 15 illustrates the percentage differences in GAEP with respect to the baseline case and case 1b for the six cases of the example. Case 1b is the baseline and is based on the airfoil t/c and the design $c_1$ distributions of the prior art Z-48 blade. A 0.1% decrease in GAEP in FIG. 1 results to an annual loss of approximately $367 per turbine at $0.05/kWh. As shown in FIG. 8, the baseline case provides a significant amount of energy compared with the other cases. The baseline case is the best-case scenario in terms of energy capture but is one of the worst designs from a structural point of view. Therefore, the optimum case is not the baseline case when the objective is to balance structural and aerodynamic requirements. The similar GAEP in each of these cases illustrates that the decrease in energy capture from increasing the airfoil t/c is compensated by the increase in GAEP from increasing the design $c_1$.

Figure 16:
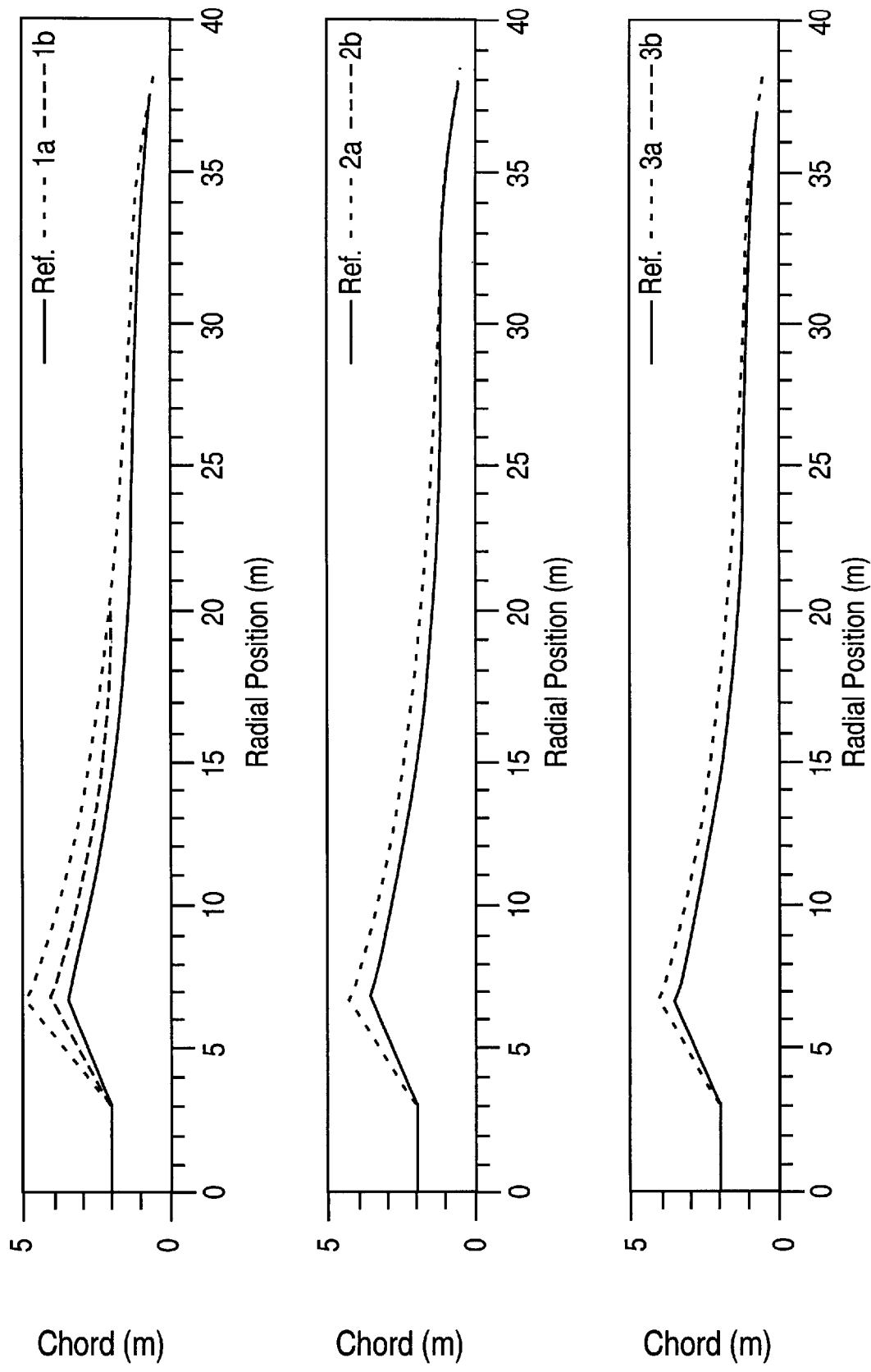
FIG. 16 is a diagram showing chord distribution for blade design.
Figure 17:
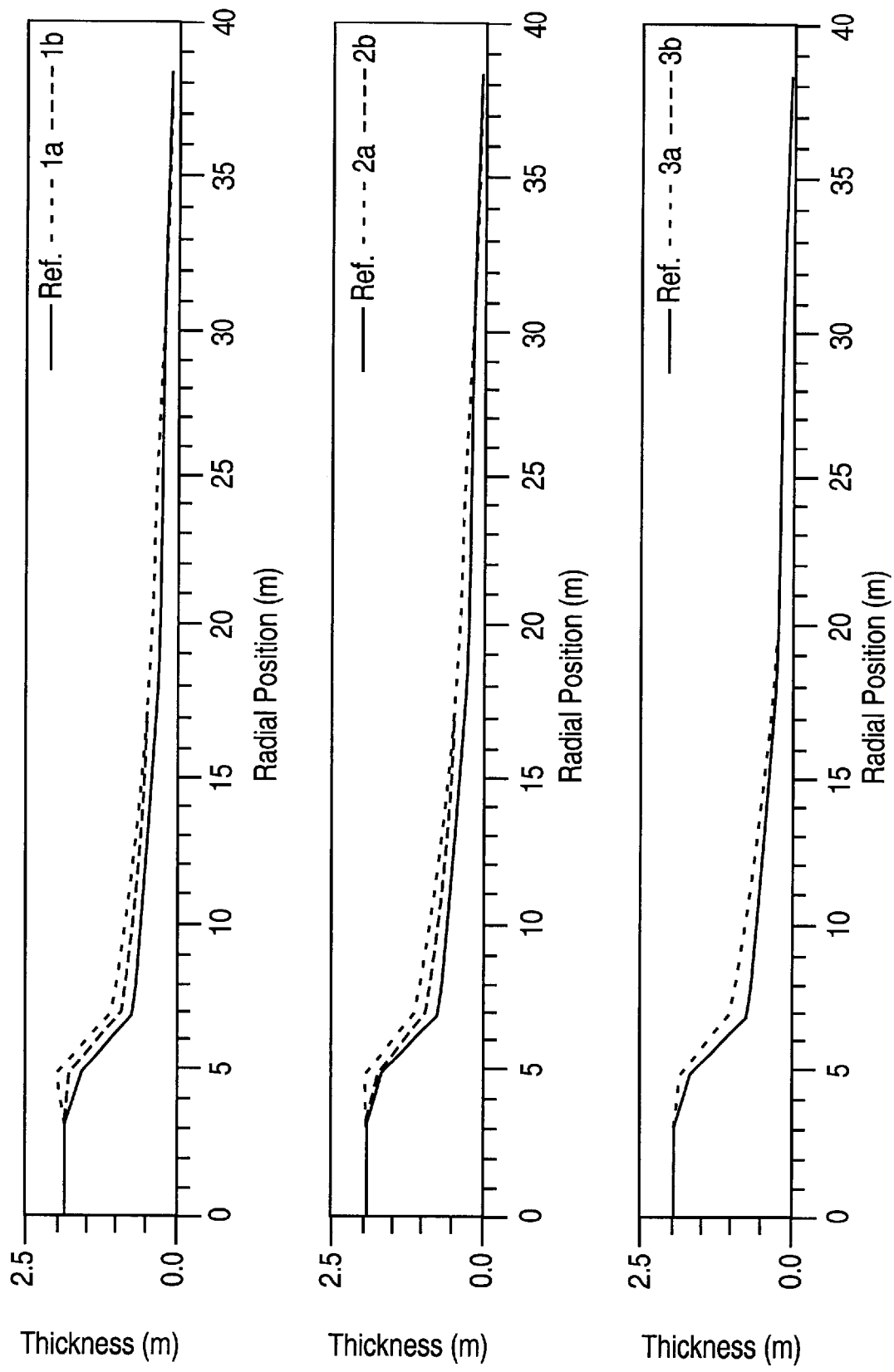
FIG. 17 is a diagram showing physical thickness distribution for blade design.
Figure 18:
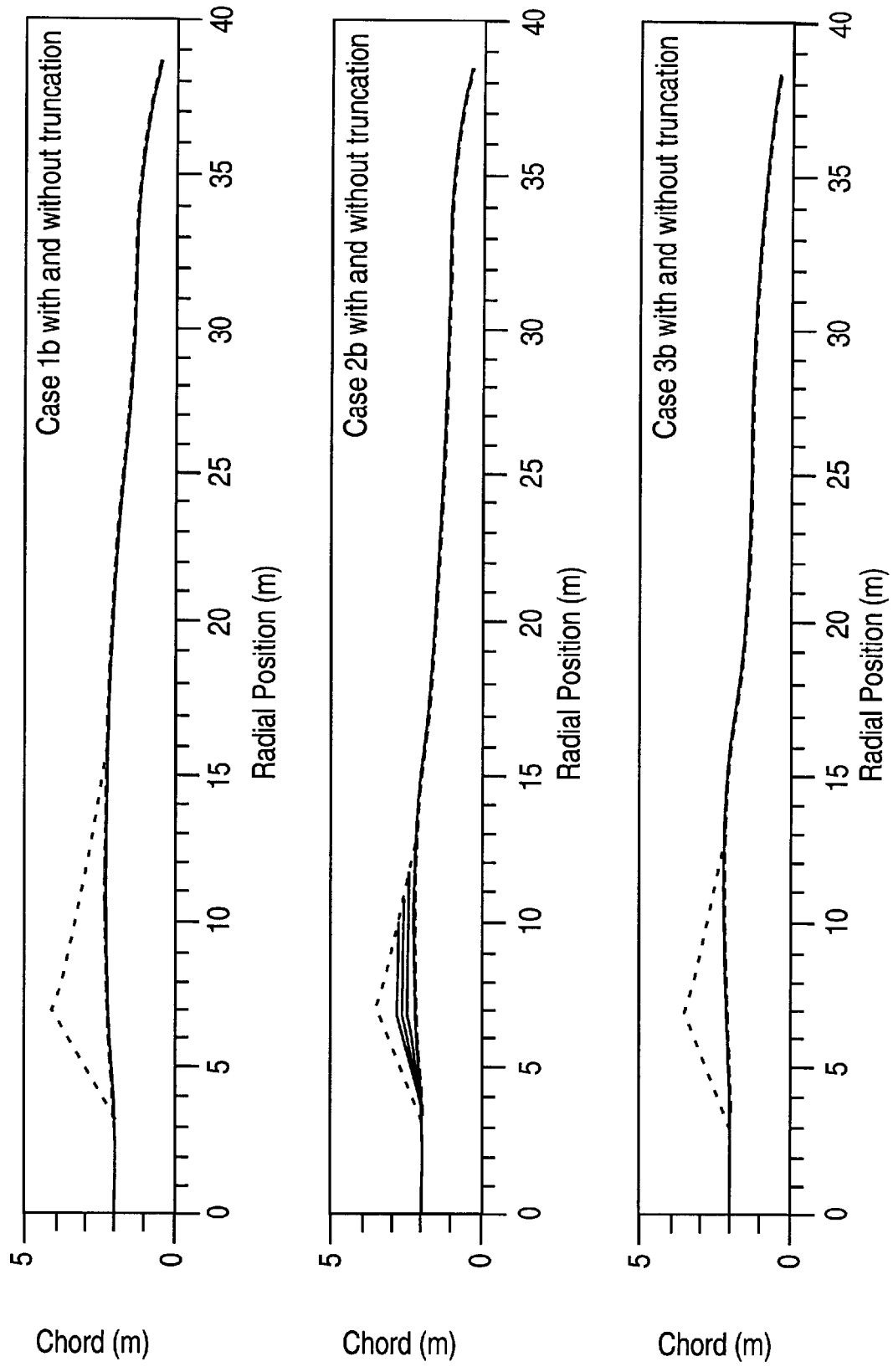
FIG. 18 is a diagram showing chord distributions for the blade designs 1b, 2b, and 3b with and without truncation.
Figure 19:
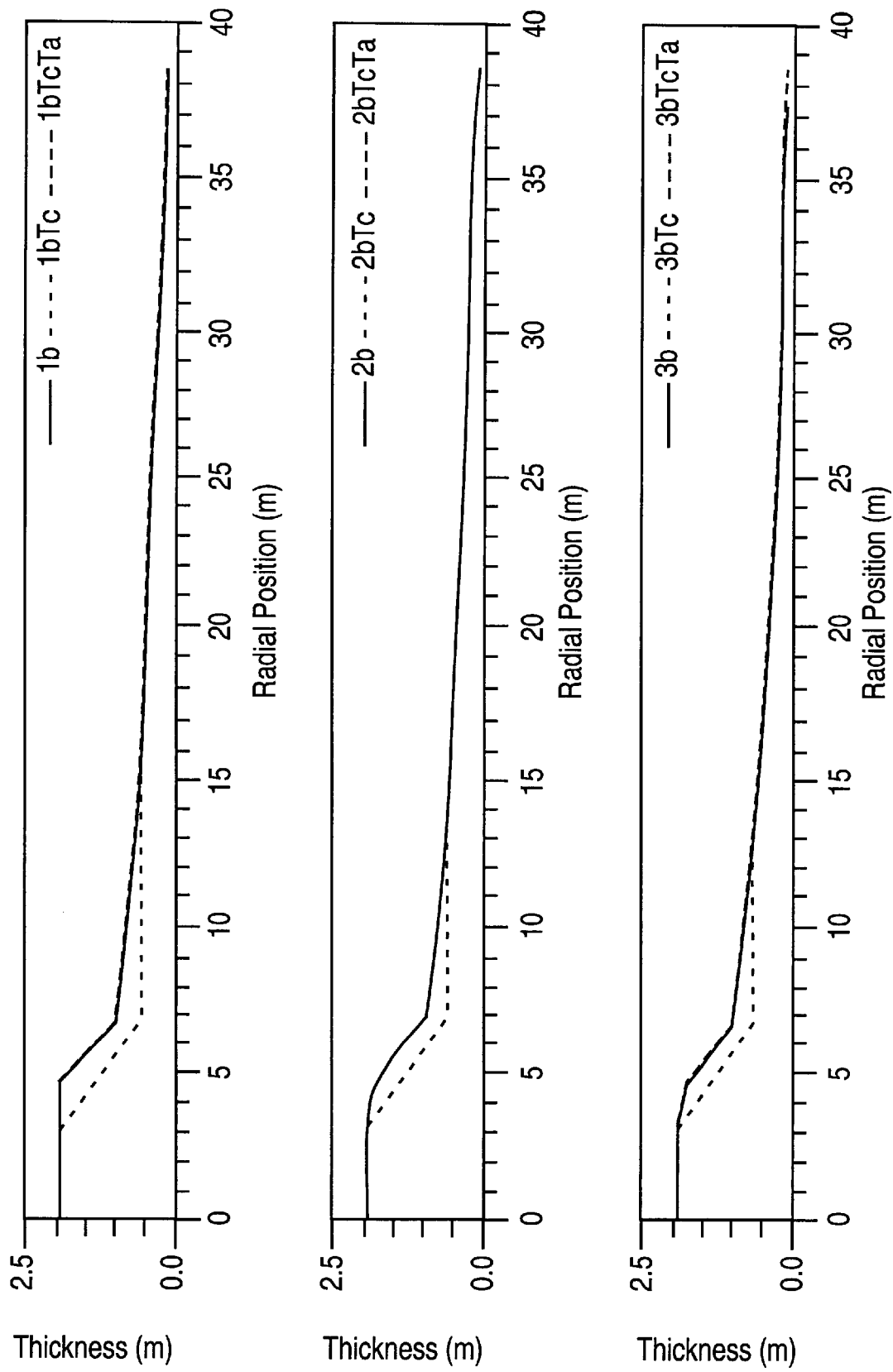
FIG. 19 is a diagram showing thickness distribution for the blade designs 1b, 2b and 3b with and without truncated airfoils.

An indication of the structural implications of each case is illustrated in FIGS. 16 and 18, depicting the corresponding chord and physical thickness distributions, respectively. In all cases, inboard chord lengths are large, which increases the costs of the blades. Consequently, truncating the inboard chord lengths is an attractive option. FIG. 18 shows the chord distributions with and without truncation of the inboard chord lengths for cases 1b, 2b and 3b. The corresponding distributions for the physical blade thickness are depicted in FIG. 19. Tc stands for truncated chords and Ta stands for truncated airfoils. FIG. 19 clearly supports the structural advantage of truncating the airfoil when truncating the chord.

Figure 20:
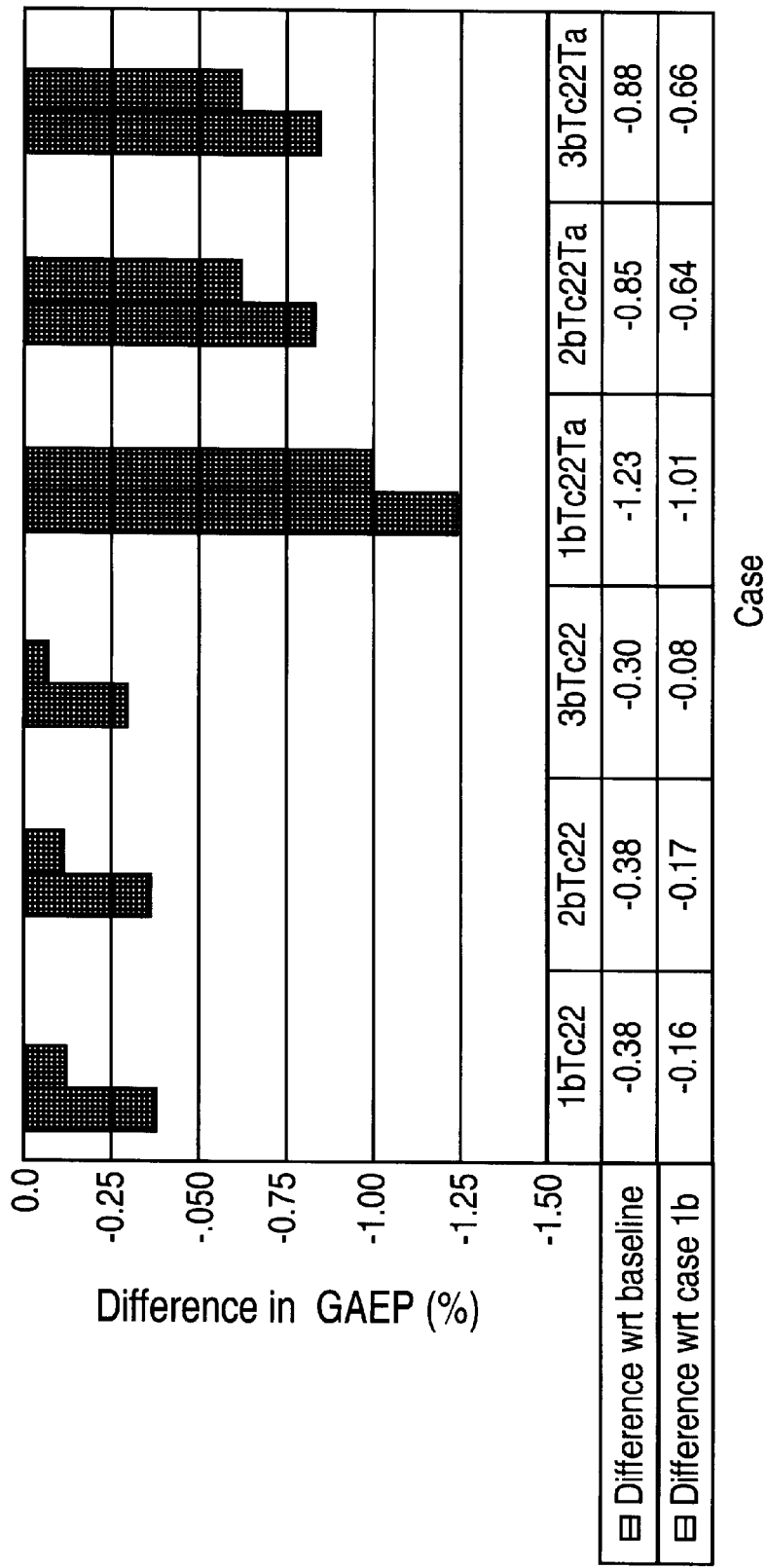
FIG. 20 is a chart showing the difference in GAEP capture with respect to the baseline case 7,336.7 MWh) and case 1b (7,320.6 MWh) for the cases with inboard chord truncation.

The effects of truncating the inboard chord to a maximum length of 2.2 m (or in this case 10% larger than the hub diameter) in case 1b, 2b and 3b are indicated in FIG. 20. Results for two scenarios are illustrated. In those cases with the extension "Tc22" (maximum chord of 2.2 m), the root airfoil was not truncated while those for the cases with the extension "Tc22Ta" used a truncated root airfoil. The extent of the truncation is directly proportional to the reduction in chord length. Cases with a larger extent of truncation have a larger decrease in GAEP, and truncating the airfoils further reduced the GAEP. Reduction from chord truncation results in a decrease in GAEP of $293–$624 at $0.05/kWh. Truncation of the root airfoil in addition to the chord increases the annual loss of GAEP to between $2,055 and $3,707. However, this approach may still be desirable based on the structural implications of the application.

Figure 21:
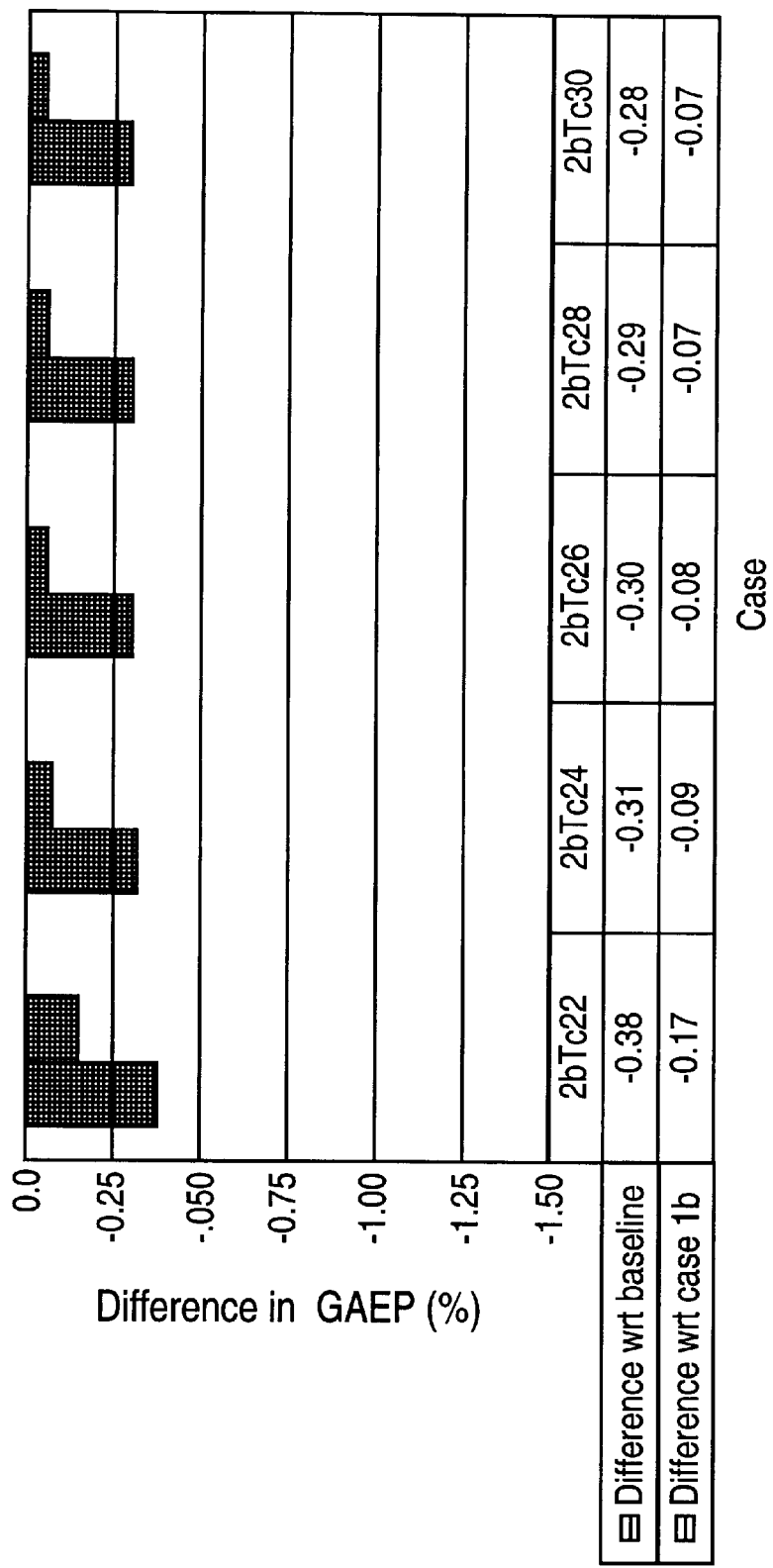
FIG. 21 is a chart showing the difference in GAEP capture with respect to the baseline case 7,336.7 MWh) and case 2b (7,320.6 MWh) with increasing inboard chord for case 2b without airfoil truncation.
Figure 22:
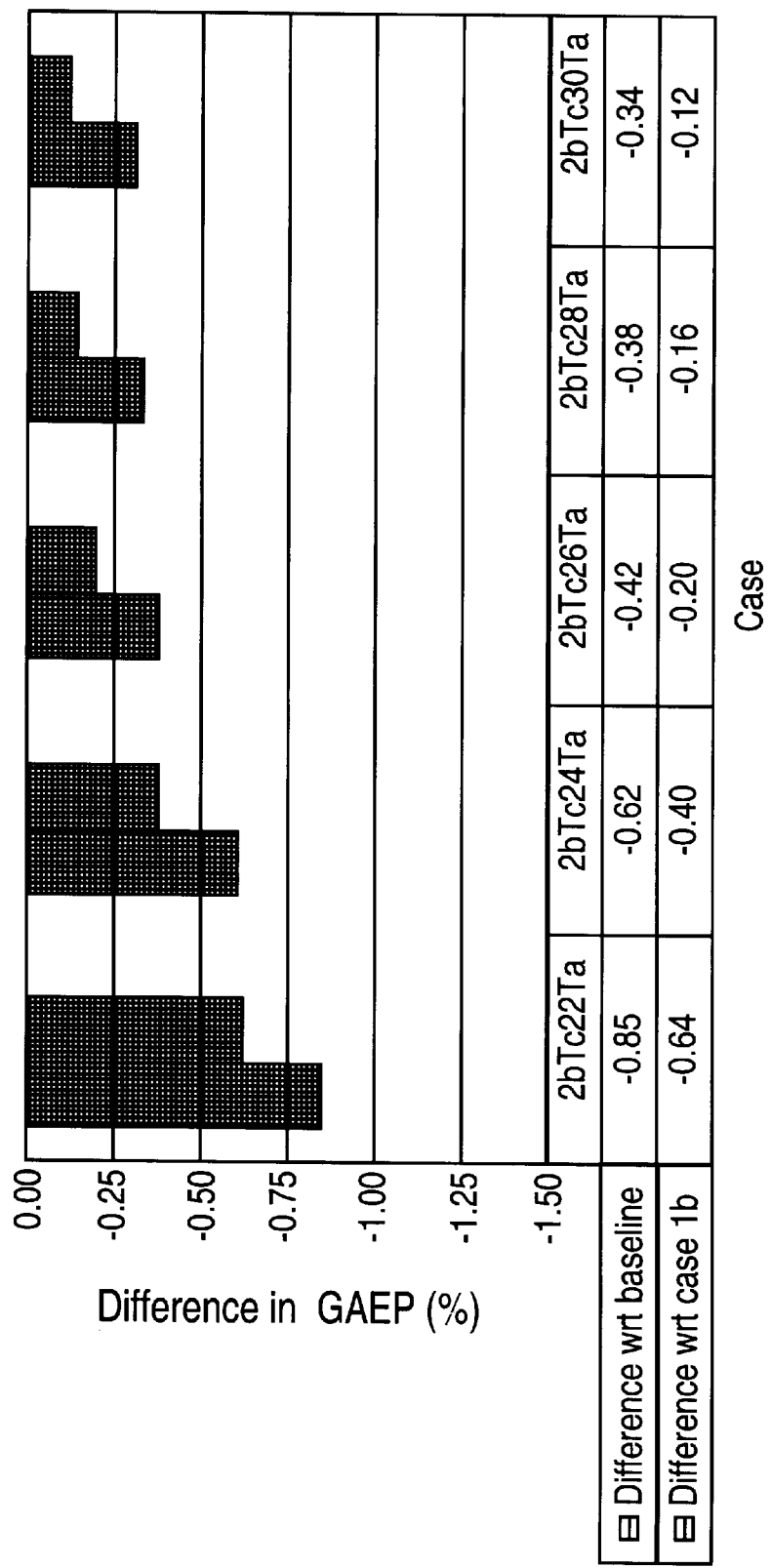
FIG. 22 is a chart showing the difference in GAEP capture with respect to the baseline case (7,336.7 MWh) and case 2b (7,320.6 MWh) with increasing inboard chord for case 2b with airfoil truncation.

Smaller amounts of inboard chord truncation for case 2b are shown in FIG. 21, without truncation of the airfoil, and FIG. 22, with truncation of the airfoil. Maximum chord lengths are 2.4 m, 2.6 m, 2.8 m and 3.0 m. As shown in FIG. 21, the maximum chord length of 2.4 m (or approximately 70% of the maximum chord length before truncation is the point of diminishing return. When the root airfoil is truncated, the optimum chord length truncation is to 2.6 m see FIG. 22. Note that limiting the chord to 2.6 m, the same GAEP as without chord truncation is virtually achieved.

These tests results provide the criteria for maximizing airfoil performance to achieve highest GAEP while taking into consideration the aerodynamic design parameters as balanced against structural requirements. The methodology of the subject invention permits the design of airfoils of predictable performance while achieving necessary structural integrity.

Figure 23:
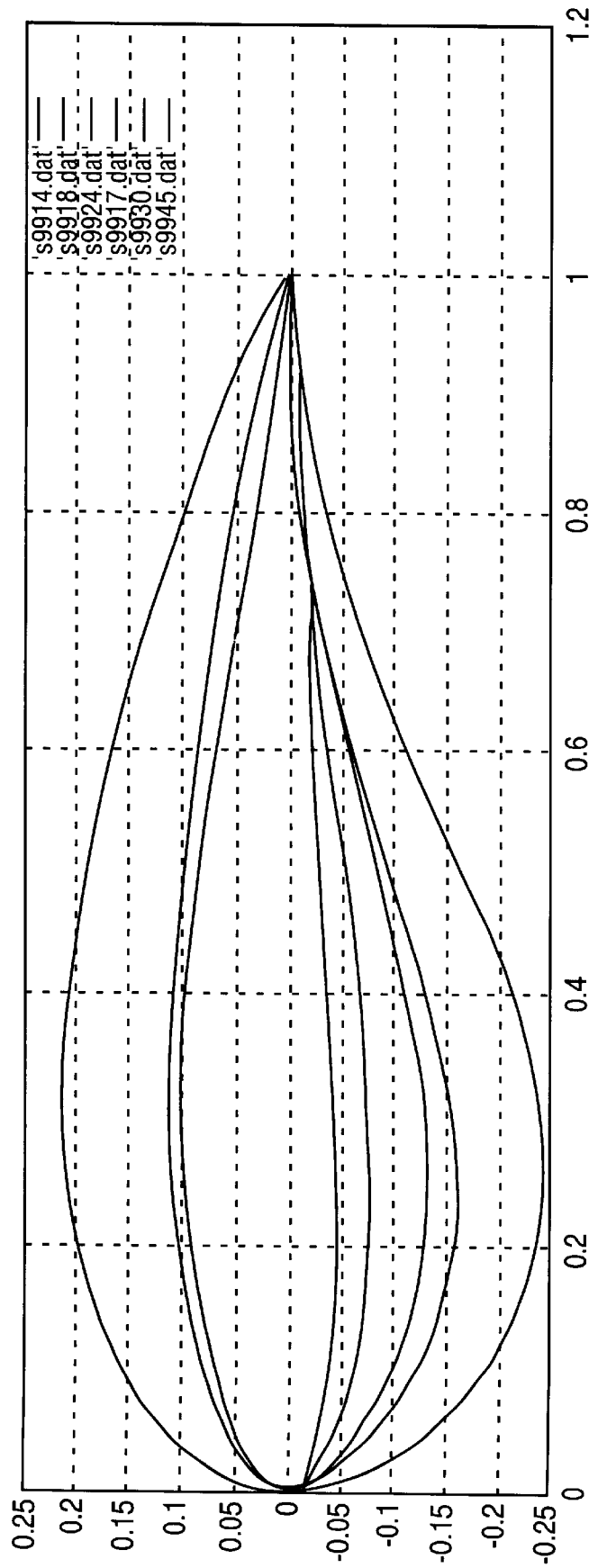
FIG. 23 is a composite plot of all airfoils to scale with grid.

As a result of this approach, the subject invention has resulted in a family of airfoils having operational and structural characteristics with substantially enhanced performance capability over prior airfoils used in the same or similar applications. The family of airfoils includes thickness-to-chord ratios ranging from 14% to 45%. A composite of all airfoils configured using these criteria is shown in FIG. 23.

The first airfoil includes a thickness-to-chord ratio of 14% with maximum t/c located near the 30% chord. The design lift coefficient is 1.10 to 1.25 at which maximum lift-to-drag occurs. The design Reynolds number is 8 million. In performance this airfoil has demonstrated relatively soft stall characteristics. The airfoil has relative insensitivity to leading edge surface roughness of the maximum and design lift coefficients. This airfoil may be easily blended with other airfoils in the family of airfoils made in accordance with the subject invention.

Another airfoil in this family includes a thickness-to-chord ratio of 18% with maximum t/c located near the 30% chord. The design lift coefficient is 1.10 to 1.25 at which maximum lift-to-drag occurs. The design Reynolds number is 8 million. In performance this airfoil has demonstrated relatively soft stall characteristics. The airfoil has relative insensitivity to leading edge surface roughness of the maximum and design lift coefficients. This airfoil may be easily blended with other airfoils in the family of airfoils made in accordance with the subject invention.

An additional airfoil includes a thickness-to-chord ratio of 24% with maximum t/c located near the 30% chord. The design lift coefficient is 1.20 to 1.25 at which maximum lift-to-drag occurs. The design Reynolds number is 7 million. In performance this airfoil has demonstrated relatively soft stall characteristics. The airfoil has relative insensitivity to leading edge surface roughness of the maximum and design lift coefficients. This airfoil may be easily blended with other airfoils in the family of airfoils made in accordance with the subject invention.

An additional airfoil includes a thickness-to-chord ratio of 27% with maximum t/c located near the 30% chord. The design lift coefficient is 1.20 to 1.30 at which maximum lift-to-drag occurs. The design Reynolds number is 5 million. In performance this airfoil has demonstrated relatively soft stall characteristics. The airfoil has relative insensitivity to leading edge surface roughness of the maximum and design lift coefficients. This airfoil may be easily blended with other airfoils in the family of airfoils made in accordance with the subject invention.

An additional airfoil includes a thickness-to-chord ratio of 30% with maximum t/c located near the 20% chord. The design lift coefficient is 1.25–1.45 at which maximum lift-to-drag occurs. The design Reynolds number is 4 million. In performance this airfoil has demonstrated relatively soft stall characteristics. The airfoil has relative insensitivity to leading edge surface roughness of the maximum and design lift coefficients. This airfoil may be easily blended with other airfoils in the family of airfoils made in accordance with the subject invention.

An additional airfoil includes a thickness-to-chord ratio of 45% with maximum t/c located near the 30% chord. The design lift coefficient is 1.25 at which maximum lift-to-drag occurs. The design Reynolds number is 3 million. In performance this airfoil has demonstrated relatively soft stall characteristics. The airfoil has relative insensitivity to leading edge surface roughness of the maximum and design lift coefficients. This airfoil may be easily blended with other airfoils in the family of airfoils made in accordance with the subject invention.

These airfoils form a family capable of being physically blended into a smooth rotor blade surface. The thickest (45%) airfoil may be a truncated airfoil in certain applications. The primary airfoil (18%) and the thick tip airfoil (14%) have increased laminar flow. This promotes a softer stall, which is more desirable. It also leads to improved rotor performance. Noise was also taken into consideration in the tip airfoil design. It is likely that for an airfoil with high aft loading (large aft underchamber) there will be associated increased unsteadiness in the airfoil wake, creating increased noise. Thus the tip airfoil is designed with no aft loading on the trailing edge. The wake is less likely to be unsteady and consequently this will lead to quieter blade operation.

With respect to the inboard root-region airfoils more weight was given to obtaining satisfactory lift performance rather than low drag. This objective derives from studying the torque contribution for the root region of the blade. For power production, greater emphasis should be placed on lift rather than the lift-to-drag ratio. For such thick airfoils, the challenge was to avoid excessive roughness losses. Two approaches were therefore taken: (1) only a short run of laminar flow was permitted, and (2) the suction surface pressure distributions were not pushed to any limiting extreme. However, to maintain this favorable upper surface pressure distribution and also achieve high lift, the lower surface of the 30% thick airfoil includes considerable underchamber. In the design of the 45% thick airfoil, both the upper surface and lower surface pressure distributions become more extreme, and the performance is further limited as would be expected, especially under rough conditions.

A preliminary 45% thick airfoil included a 9% trailing edge thickness to further alleviate the strong pressure recovery on the upper surface that is solely a consequence of the high thickness. The thinner trailing edge of 1.2% is used in the final design because of manufacturing considerations. A feature introduced into these airfoils is the blunt leading edges that should lead to more favorable startup torque when the airfoils operate at or near 90°.

While certain features and embodiments of the invention have been described in detail herein it will be understood that the invention includes all improvements, modifications and enhancements within the scope and spirit of the following claims.

What is claimed is:

1. An airfoil cross-section on a blade for a power wind turbine, the blade having a hub, an outer tip and an inboard chord length at the hub, an outboard chord length at the tip and intermediate chord lengths therebetween ranging from 0% to 100% as measured from the hub, and a thickness that is measured as the ratio between the thickness and the chord length at a specific chord location, the airfoil comprising:
   a. a thickness-to-chord ratio in the range of 14% to 45% at approximately the 30% chord;
   b. a design lift coefficient in the range of 1.10–1.25;
   c. a design Reynolds number in the range of 3 million to 8 million; and
   d. a 45% thick airfoil including a trailing edge thickness in the approximate range of 1.2% to 9%.

2. The airfoil of claim 1, further including a blunt leading edge.

3. The airfoil of claim 1, further including a truncated inboard chord which is approximately 70% of the chord length before truncation.

4. The airfoil of claim 1, further including a truncated inboard chord which is approximately 10% larger than the hub diameter.

5. An airfoil cross-section on a blade for a power wind turbine, the blade having a hub, an outer tip and an inboard chord length at the hub, an outboard chord length at the tip and intermediate chord lengths therebetween ranging from 0% to 100% as measured from the hub, and a thickness that is measured as the ratio between the thickness and the chord length at a specific chord location, the airfoil comprising:
   a. a thickness-to-chord ratio in the range of approximately 14% at approximately the 30% chord;
   b a design lift coefficient in the range of 1.10–1.25; and
   c. a design Reynolds number of approximately 8 million.

6. An airfoil cross-section on a blade for a power wind turbine, the blade having a hub, an outer tip and an inboard chord length at the hub, an outboard chord length at the tip and intermediate chord lengths therebetween ranging from 0% to 100% as measured from the hub, and a thickness that is measured as the ratio between the thickness and the chord length at a specific chord location, the airfoil comprising:

a. a thickness-to-chord ratio in the range of approximately 18% at approximately the 30% chord;
   b. a design lift coefficient in the range of 1.10–1.25; and
   c. a design Reynolds number of approximately 8 million.

7. An airfoil cross-section on a blade for a power wind turbine, the blade having a hub, an outer tip and an inboard chord length at the hub, an outboard chord length at the tip and intermediate chord lengths therebetween ranging from 0% to 100% as measured from the hub, and a thickness that is measured as the ratio between the thickness and the chord length at a specific chord location, the airfoil comprising:

a) a thickness-to-chord ratio in the range of approximately 24% at the approximately 30% chord;
   b) a design lift coefficient in the range of 1.20 and 1.25; and
   c) a design Reynolds number of approximately 7 million.

8. An airfoil cross-section on a blade for a power wind turbine, the blade having a hub, an outer tip and an inboard chord length at the hub, an outboard chord length at the tip and intermediate chord lengths therebetween ranging from 0% to 100% as measured from the hub, and a thickness that is measured as the ratio between the thickness and the chord length at a specific chord location, the airfoil comprising:

a. a thickness-to-chord ratio in the range of approximately 27% at the approximately 30% chord;
   b. a design lift coefficient in the range of 1.20 and 1.30; and
   c. a design Reynolds number of approximately 5 million.

9. An airfoil cross-section on a blade for a power wind turbine, the blade having a hub, an outer tip and an inboard chord length at the hub, an outboard chord length at the tip and intermediate chord lengths therebetween ranging from 0% to 100% as measured from the hub, and a thickness that is measured as the ratio between the thickness and the chord length at a specific chord location, the airfoil comprising:

a. a thickness-to-chord ratio in the range of approximately 30% at the approximately 30% chord;
   b. a design lift coefficient in the range of 1.25 and 1.40; and
   c. a design Reynolds number of approximately 4 million.

10. An airfoil cross-section on a blade for a power wind turbine, the blade having a hub, an outer tip and an inboard chord length at the hub, an outboard chord length at the tip and intermediate chord lengths therebetween ranging from 0% to 100% as measured from the hub, and a thickness that is measured as the ratio between the thickness and the chord length at a specific chord location, the airfoil comprising:

a. a thickness-to-chord ratio in the range of approximately 45% at the approximately 30% chord;
   b. a design lift coefficient in the range of approximately 1.25; and
   c. a design Reynolds number of approximately 3 million.

11. A family of airfoils along a blade on a power wind turbine, the blade having a hub, an outer tip and an inboard chord length at the hub, an outboard chord length at the tip and intermediate chord lengths therebetween ranging from 0% to 100% as measured from the hub, and a thickness that is measured as the ratio between the thickness and the chord length at a specific chord location, the family comprising:

a. a first airfoil having a thickness-to-chord ratio of approximately 14% at the approximately 30% chord, a design lift coefficient in the range of 1.10 and 1.25, and a design Reynolds number of approximately 8 million;
   b. a last airfoil having a thickness-to-chord ratio of approximately 45% at the approximately 20% chord, a design lift coefficient of approximately 1.25, and a design Reynolds number of approximately 3 million.

12. The family of airfoils as called for in claim 1, further including at least one intermediate airfoil between the first and last airfoil, said intermediate airfoil comprising:

a. a thickness-to-chord ratio in the range of greater than 14% and less than 45%;
   b. a design lift coefficient of greater than 1.10 but not exceeding 1.25;
   c. a design Reynolds number of greater than 3 million but not exceeding 8 million.

13. An airfoil comprising:

a rounded leading edge;
   a trailing edge of finite thickness;
   upper and lower surfaces extending from the leading edge to the trailing edge;
   a cross-sectional shape characterized by a ratio of maximum thickness-to-chord length of approximately 14% with maximum thickness being located chordwise at a location approximately 30% from the leading edge to the trailing edge;
   a Reynolds number of approximately 8 million; and
   a lift coefficient of approximately 1.10–1.25 at the aerodynamic angle of attack at which the maximum ratio of lift to drag occurs.

* * * * *

UNITED STATES PATENT AND TRADEMARK OFFICE
CERTIFICATE OF CORRECTION

PATENT NO. : 6,503,058 B1
DATED : January 7, 2003
INVENTOR(S) : Selig et al.

It is certified that error appears in the above-identified patent and that said Letters Patent is hereby corrected as shown below:

<u>Column 1,</u>
Line 4, please add this paragraph
-- This Invention was made with Government support under NREL Subcontract No. ZAM-7-13320-26, Prime Contract DE-AC36-86CHI0093, DOE Case No. S-95,734 awarded by the Department of Energy. The Government has certain rights in this invention. --

Signed and Sealed this

Fourth Day of January, 2005

JON W. DUDAS
*Director of the United States Patent and Trademark Office*